US009540000B2

United States Patent
Hayakawa et al.

(10) Patent No.: US 9,540,000 B2
(45) Date of Patent: *Jan. 10, 2017

(54) ACCELERATION SUPPRESSION DEVICE FOR VEHICLE, AND ACCELERATION SUPPRESSION METHOD FOR VEHICLE

(71) Applicant: NISSAN MOTOR CO., LTD., Yokohama-shi, Kanagawa (JP)

(72) Inventors: Yasuhisa Hayakawa, Yokohama (JP); Osamu Fukata, Sagamihara (JP); Daisuke Tanaka, Hadano (JP); Daisuke Oiki, Zama (JP); Akira Morimoto, Sagamihara (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/442,594

(22) PCT Filed: Nov. 22, 2013

(86) PCT No.: PCT/JP2013/006886
§ 371 (c)(1),
(2) Date: May 13, 2015

(87) PCT Pub. No.: WO2014/083826
PCT Pub. Date: Jun. 5, 2014

(65) Prior Publication Data
US 2016/0137197 A1   May 19, 2016

(30) Foreign Application Priority Data

Nov. 27, 2012  (JP) .................................. 2012-259188

(51) Int. Cl.
*B60W 30/06* (2006.01)
*B60W 10/18* (2012.01)
(Continued)

(52) U.S. Cl.
CPC .............. *B60W 30/06* (2013.01); *B60K 26/04* (2013.01); *B60K 28/10* (2013.01); *B60T 7/12* (2013.01);
(Continued)

(58) Field of Classification Search
CPC ...... B60W 30/06; B60W 10/18; B60W 10/04; B60W 50/12; B60W 30/18154; B60W 2540/10; B60W 2540/12; B60W 2720/103; G08G 1/167; B60T 7/18; B60T 7/12; B60T 7/22; B60T 2201/10; B60K 28/10; B60K 26/04
See application file for complete search history.

(56) References Cited

U.S. PATENT DOCUMENTS

2004/0054966 A1*  3/2004  Busch .................... G06Q 30/02
                                                            715/223
2005/0137766 A1   6/2005  Miyakoshi et al.
(Continued)

FOREIGN PATENT DOCUMENTS

JP    2003137001 A    5/2003
JP    2004249746 A    9/2004
(Continued)

*Primary Examiner* — Rodney Butler
*Assistant Examiner* — Frederick Brushaber
(74) *Attorney, Agent, or Firm* — Young Basile Hanlon & MacFarlane, P.C.

(57) ABSTRACT

An acceleration suppression device for a vehicle and an acceleration suppression method for a vehicle can reduce a reduction in drivability due to the operation of an acceleration suppression control while crossing an intersection. If it is determined that an intersection lying ahead of an own vehicle is detected, a process is implemented to suppress an acceleration suppression control in a travel distance range in (Continued)

which the travel distance of the own vehicle after detecting the intersection is less than or equal to a preset first travel distance threshold value.

9 Claims, 18 Drawing Sheets

(51) Int. Cl.
| | |
|---|---|
| B60W 10/04 | (2006.01) |
| G08G 1/16 | (2006.01) |
| B60T 7/18 | (2006.01) |
| B60K 28/10 | (2006.01) |
| B60T 7/12 | (2006.01) |
| B60T 7/22 | (2006.01) |
| B60W 50/12 | (2012.01) |
| B60W 30/18 | (2012.01) |
| B60K 26/04 | (2006.01) |

(52) U.S. Cl.
CPC .. *B60T 7/18* (2013.01); *B60T 7/22* (2013.01); *B60W 10/04* (2013.01); *B60W 10/18* (2013.01); *B60W 30/18154* (2013.01); *B60W 50/12* (2013.01); *G08G 1/167* (2013.01); *B60T 2201/10* (2013.01); *B60W 2420/403* (2013.01); *B60W 2540/10* (2013.01); *B60W 2540/12* (2013.01); *B60W 2540/18* (2013.01); *B60W 2720/103* (2013.01); *B60W 2720/106* (2013.01)

(56) References Cited

U.S. PATENT DOCUMENTS

| | | | | |
|---|---|---|---|---|
| 2010/0191434 | A1* | 7/2010 | Fujita | B60T 8/172 701/91 |
| 2010/0228574 | A1* | 9/2010 | Mundinger | G06Q 10/047 705/4 |
| 2012/0143456 | A1* | 6/2012 | Ueda | B60W 10/08 701/93 |
| 2012/0316763 | A1* | 12/2012 | Haynes, III | G01C 21/3492 701/117 |
| 2014/0039728 | A1 | 2/2014 | Imazu et al. | |
| 2015/0258988 | A1* | 9/2015 | Morimoto | B62D 15/027 701/70 |
| 2015/0284000 | A1* | 10/2015 | Hayakawa | B60W 50/12 701/70 |
| 2015/0291030 | A1* | 10/2015 | Oiki | B60W 50/12 701/70 |
| 2015/0291031 | A1* | 10/2015 | Morimoto | B60W 50/12 701/70 |
| 2015/0321555 | A1* | 11/2015 | Fukata | B60W 30/06 701/70 |
| 2015/0321667 | A1* | 11/2015 | Fukata | B60W 50/12 701/70 |
| 2016/0137197 | A1* | 5/2016 | Hayakawa | B60K 26/04 701/70 |
| 2016/0156773 | A1* | 6/2016 | Chanda | H04M 1/72522 455/414.1 |

FOREIGN PATENT DOCUMENTS

| | | |
|---|---|---|
| JP | 2005-178626 A | 7/2005 |
| JP | 2006273122 A | 10/2006 |
| JP | 2007-076586 A | 3/2007 |
| JP | 2007266976 A | 10/2007 |
| JP | 2011-066657 A | 3/2011 |
| JP | 2012001081 A | 1/2012 |
| JP | 2012136206 A | 7/2012 |
| JP | 2012228119 A | 11/2012 |

\* cited by examiner

FIG. 14

| ENTRY CERTAINTY \ BORDER CERTAINTY | LEVEL 0 | LEVEL 1 | LEVEL 2 | LEVEL 3 | LEVEL 4 |
|---|---|---|---|---|---|
| LEVEL 0 | — | — | — | — | — |
| LEVEL LOW | — | EXTREMELY LOW | LOW | LOW | LOW |
| LEVEL HIGH | — | EXTREMELY LOW | LOW | HIGH | EXTREMELY HIGH |

FIG. 15

| ACCELERATION SUPPRESSION CONDITION \ TOTAL CERTAINTY | EXTREMELY LOW | LOW | HIGH | EXTREMELY HIGH |
|---|---|---|---|---|
| SUPPRESSION CONTROL START TIMING (ACCELERATOR OPENING DEGREE) | 80% | 80% | 50% | 50% |
| SUPPRESSION AMOUNT | SMALL | MIDDLE | MIDDLE | LARGE |
| ALARM SOUND | NO | YES | YES | YES |

| ACCELERATION SUPPRESSION CONDITION / PARKING BORDER CERTAINTY | LEVEL 1 | LEVEL 2 | LEVEL 3 | LEVEL 4 |
|---|---|---|---|---|
| SUPPRESSION CONTROL START TIMING (ACCELERATOR OPENING DEGREE) | 80% | 80% | 50% | 50% |
| SUPPRESSION AMOUNT | SMALL | MIDDLE | MIDDLE | LARGE |
| ALARM SOUND | NO | YES | YES | YES |

ACCELERATION SUPPRESSION DEVICE FOR VEHICLE, AND ACCELERATION SUPPRESSION METHOD FOR VEHICLE

CROSS REFERENCE TO RELATED APPLICATION

The present application claims priority to Japanese Patent Application No. 2012-259188, filed Nov. 27, 2012, incorporated herein in its entirety.

TECHNICAL FIELD

The present invention relates to a vehicle acceleration suppression technology for performing driving support at the time of parking.

BACKGROUND

As a device configured to control the speed of a vehicle, there is, for example, a safety device described in JP 2003-137001 A. This safety device detects, from map data of a navigation device and information of a current position, that the vehicle is located at a position deviating from a road and, when determining that an accelerator is operated in a direction to increase the travel speed of the vehicle and that the travel speed of the vehicle is greater than a predetermined value, the safety device controls a throttle in the deceleration direction regardless of the operation of the accelerator.

JP 2003-137001 A aims to prevent driver's unintentional acceleration of the vehicle even if the accelerator is erroneously operated. Here, a problem arises as to how to determine whether or not the operation of the accelerator is in error. In JP 2003-137001 A, if an accelerator is depressed when an own vehicle is detected to be at a position deviating from a road based on map data and a travel speed is detected to be greater than or equal to a predetermined value, it is determined that there is a possibility of the accelerator having been operated in error, and this condition is set as an operating condition for throttle suppression.

However, with the above operating condition, the throttle suppression is operated depending on a vehicle speed only when the vehicle deviates from a road and enters a parking lot, thus reducing the drivability in the parking lot.

The present invention has been made by paying attention to the point described above and has an object to reduce a reduction in drivability due to the occurrence of acceleration suppression control when an own vehicle travels in an area other than a parking area.

SUMMARY

In order to solve the above-described problem, one aspect of the present invention implements an acceleration suppression control as a control configured to extract a parking frame from a line located on a road surface and detected from an image capturing an area including a road surface around an own vehicle, and configured to, based on the extracted parking frame, reduce acceleration which is generated for the own vehicle depending on an acceleration operation amount of an acceleration operation member configured to be operated by a driver for instructing acceleration. Further, the acceleration suppression control is suppressed in a predetermined area including an intersection.

The present invention suppresses an acceleration suppression control in a predetermined area including an intersection. This makes it possible to reduce a reduction in drivability due to acceleration suppression control that occurs when an own vehicle crosses the intersection.

BRIEF DESCRIPTION OF THE DRAWINGS

FIG. 14 is a diagram showing a total certainty setting map;

FIG. 15 is a diagram showing an acceleration suppression condition computing map;

DETAILED DESCRIPTION OF THE EMBODIMENTS

An embodiment of the present invention will now be described with reference to the drawings.

(Configuration)

Figure 1:
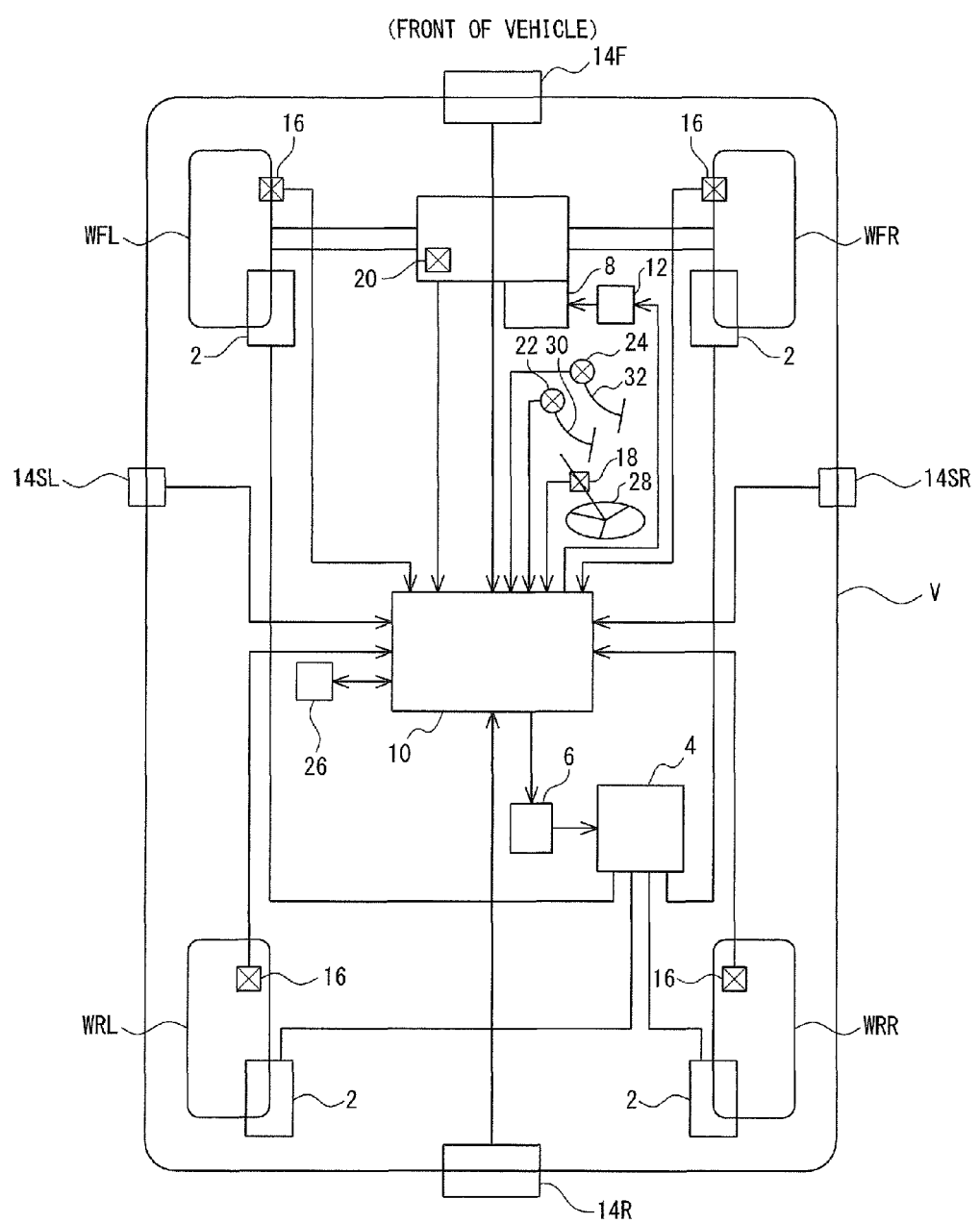
FIG. 1 is a conceptual diagram showing a configuration of a vehicle equipped with a vehicle acceleration suppression device.

First, using FIG. 1, the configuration of a vehicle equipped with a vehicle acceleration suppression device of this embodiment will be described. FIG. 1 is a conceptual diagram showing a configuration of a vehicle V equipped with a vehicle acceleration suppression device 1 of this embodiment.

As shown in FIG. 1, the own vehicle V includes wheels W (right front wheel WFR, left front wheel WFL, right rear wheel WRR, left rear wheel WRL), brakes 2, a fluid pressure circuit 4, and a brake controller 6. In addition, the own vehicle V includes an engine 8 and an engine controller 12. The brake 2 is formed, for example, by using a wheel cylinder and is provided at each wheel W. The brake 2 is not limited to a device configured to apply a braking force by a fluid pressure and may alternatively be formed by using an electric brake or the like. The fluid pressure circuit 4 is a circuit including pipes connected to the respective brakes 2.

Based on a braking force command value input from a travel control controller 10 serving as a host controller, the brake controller 6 controls braking forces generated at the respective brakes 2 to values corresponding to the braking force command value via the fluid pressure circuit 4. That is, the brake controller 6 forms a deceleration control device. A description of the travel control controller 10 will be given later.

Therefore, the brakes 2, the fluid pressure circuit 4, and the brake controller 6 form a brake device configured to generate braking forces.

The engine 8 forms a drive source of the own vehicle V. The engine controller 12 controls the torque (driving force) generated in the engine 8 based on a target throttle opening degree signal (acceleration command value) input from the travel control controller 10. That is, the engine controller 12 forms an acceleration control device. A description of the target throttle opening degree signal will be given later. Therefore, the engine 8 and the engine controller 12 form a drive device configured to generate a driving force.

The drive source of the own vehicle V is not limited to the engine 8 and may alternatively be formed by using an electric motor. Alternatively, the drive source of the own vehicle V may be formed by combining the engine 8 and the electric motor.

Figure 2:
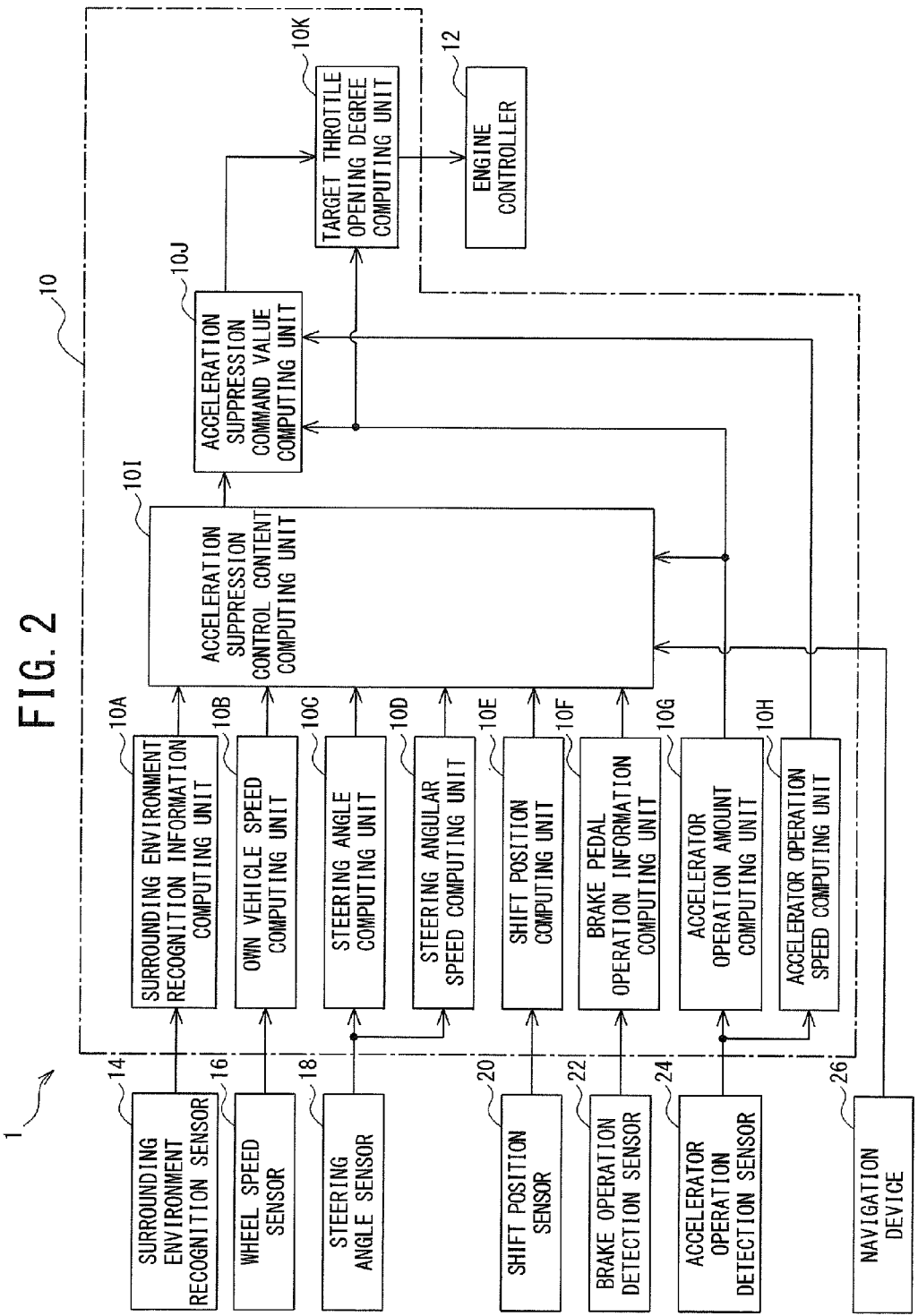
FIG. 2 is a block diagram showing a schematic configuration of the vehicle acceleration suppression device.

Next, using FIG. 2 while referring to FIG. 1, a schematic configuration of the vehicle acceleration suppression device 1 will be described. FIG. 2 is a block diagram showing a schematic configuration of the vehicle acceleration suppression device 1 of this embodiment.

As shown in FIGS. 1 and 2, the vehicle acceleration suppression device 1 includes a surrounding environment recognition sensor 14, wheel speed sensors 16, a steering angle sensor 18, a shift position sensor 20, a brake operation detection sensor 22, and an accelerator operation detection sensor 24. In addition, the vehicle acceleration suppression device 1 includes a navigation device 26 and the travel control controller 10.

The surrounding environment recognition sensor 14 captures images around the own vehicle V and, based on the respective captured images, produces information signals including individual images corresponding to a plurality of imaging directions (hereinafter may be referred to as "individual image signals"). Then, the surrounding environment recognition sensor 14 outputs the produced individual image signals to the travel control controller 10.

In this embodiment, as one example, a description will be given of the case where the surrounding environment recognition sensor 14 is formed by using a front camera 14F, a right-side camera 14SR, a left-side camera 14SL, and a rear camera 14R. Herein, the front camera 14F is a camera for capturing an image forward in the vehicle longitudinal direction of the own vehicle V, the right-side camera 14SR is a camera for capturing an image rightward of the own vehicle V, the left-side camera 14SL is a camera for capturing an image leftward of the own vehicle V, and the rear camera 14R is a camera for capturing an image rearward in the vehicle longitudinal direction of the own vehicle V.

In this embodiment, the surrounding environment recognition sensor 14 images a distance range of a maximum imaging range (e.g. 100 [m]) of each camera at a view angle that can capture a road surface around the own vehicle V.

Each wheel speed sensor 16 is formed, for example, by using a pulse generator such as a rotary encoder configured to measure wheel speed pulses. Each wheel speed sensor 16 detects a rotational speed of the wheel W and outputs an information signal including the detected rotational speed (hereinafter may be referred to as a "wheel speed signal") to the travel control controller 10. The steering angle sensor 18 is provided, for example, on a steering column (not illustrated) by which a steering wheel 28 is rotatably supported.

The steering angle sensor 18 detects a current steering angle being a current rotation angle (steering operation amount) of the steering wheel 28 serving as a steering operation member and outputs an information signal including the detected current steering angle (hereinafter may be referred to as a "current steering angle signal") to the travel control controller 10. Alternatively, an information signal including a steered angle of the steered wheel may be detected as information indicative of a steering angle.

The steering operation member is not limited to the steering wheel 28 configured to be rotated by a driver and may be, for example, a lever configured for tilting operation by a driver's hand. In this case, a tilted angle of the lever from a neutral position is output as an information signal corresponding to a current steering angle signal.

The shift position sensor 20 detects a current position of a member, such as a shift knob or a shift lever, configured to change a shift position (e.g. "P", "D", "R", or the like) of the own vehicle V. Then, the shift position sensor 20 outputs an information signal including the detected current position (hereinafter may be referred to as a "shift position signal") to the travel control controller 10.

The brake operation detection sensor 22 detects an opening degree of a brake pedal 30 serving as a braking force instruction operation member. Then, the brake operation detection sensor 22 outputs an information signal including the detected opening degree of the brake pedal 30 (hereinafter may be referred to as a "brake opening degree signal") to the travel control controller 10.

Herein, the braking force instruction operation member can be operated by a driver of the own vehicle V and is configured to instruct a braking force of the own vehicle V based on a change in opening degree. The braking force instruction operation member is not limited to the brake pedal 30 configured for depression operation by a driver's foot and may be, for example, a lever configured to be operated by a driver's hand.

The accelerator operation detection sensor 24 detects an opening degree of an accelerator pedal 32 serving as a driving force instruction operation member. Then, the accelerator operation detection sensor 24 outputs an information signal including the detected opening degree of the accelerator pedal 32 (hereinafter may be referred to as an "accelerator opening degree signal") to the travel control controller 10.

Herein, the driving force instruction operation member can be operated by a driver of the own vehicle V and is configured to instruct a driving force of the own vehicle V based on a change in opening degree. The driving force instruction operation member is not limited to the accelerator pedal 32 configured for depression operation by a driver's foot and may be, for example, a lever configured to be operated by a driver's hand.

The navigation device 26 is a device including a GPS (Global Positioning System) receiver, a map database, and an information presentation device having a display monitor and so on, and configured to perform route search, route guidance, and so on.

Based on a current position of the own vehicle V obtained by using the GPS receiver and road information stored in the map database, the navigation device 26 is capable of obtaining road information such as the type, width, and so on of a road on which the own vehicle V is traveling.

The navigation device 26 outputs an information signal including the current position of the own vehicle V obtained by using the GPS receiver (hereinafter may be referred to as an "own vehicle position signal") to the travel control controller 10. In addition, the navigation device 26 outputs an information signal including the type, road width, and so on of the road on which the own vehicle V is traveling (hereinafter may be referred to as a "travel road information signal") to the travel control controller 10.

In accordance with a control signal from the travel control controller 10, the information presentation device outputs an alarm or other presentation in voice or image. The information presentation device includes, for example, a speaker configured to provide information in buzzer sound or voice to a driver, and a display unit configured to provide information by displaying an image or a text. A display monitor of the navigation device 26, for example, may be used as the display unit.

The travel control controller 10 is an electronic control unit including a CPU and peripheral components thereof, such as a ROM and a RAM. The travel control controller 10 includes a parking drive support unit configured to implement a driving support process for parking.

Of processes of the travel control controller 10, the parking drive support unit functionally includes, as shown in FIG. 2, processes of a surrounding environment recognition information computing unit 10A, an own vehicle speed computing unit 10B, a steering angle computing unit 10C, and a steering angular speed computing unit 10D. In addition, the parking drive support unit functionally includes processes of a shift position computing unit 10E, a brake pedal operation information computing unit 10F, an accelerator operation amount computing unit 10G, an accelerator operation speed computing unit 10H, and an acceleration suppression control content computing unit 10I. Further, the parking drive support unit functionally includes processes of an acceleration suppression command value computing unit 10J and a target throttle opening degree computing unit 10K. These functions are created by one or two or more programs.

Based on individual image signals input from the surrounding environment recognition sensor 14, the surrounding environment recognition information computing unit 10A forms an image (bird's-eye view image) around the own vehicle V as viewing downward from above the own vehicle V. Then, the surrounding environment recognition information computing unit 10A outputs an information signal including the formed bird's-eye view image (hereinafter may be referred to as a "bird's-eye view image signal") to the acceleration suppression control content computing unit 10I.

Herein, the bird's-eye view image is formed, for example, by combining images captured by the respective cameras (the front camera 14F, the right-side camera 14SR, the left-side camera 14SL, and the rear camera 14R). The bird's-eye view image includes, for example, an image showing a road marking such as a line of a parking frame (hereinafter may be referred to as a "parking frame line") indicated on a road surface.

Based on wheel speed signals input from the wheel speed sensors 16, the own vehicle speed computing unit 10B computes a speed (vehicle speed) of the own vehicle V from rotational speeds of the wheels W. Then, the own vehicle speed computing unit 10B outputs an information signal including the computed speed (hereinafter may be referred to as a "vehicle speed computed value signal") to the acceleration suppression control content computing unit 10I.

Based on a current steering angle signal input from the steering angle sensor 18, the steering angle computing unit 10C computes, from a current rotation angle of the steering wheel 28, an operation amount (rotation angle) of the steering wheel 28 from its neutral position. Then, the steering angle computing unit 10C outputs an information signal including the computed operation amount from the neutral position (hereinafter may be referred to as a "steering angle signal") to the acceleration suppression control content computing unit 10I.

The steering angular speed computing unit 10D computes a steering angular speed of the steering wheel 28 by differentiating a current steering angle included in a current steering angle signal input from the steering angle sensor 18. Then, the steering angular speed computing unit 10D outputs an information signal including the computed steering angular speed (hereinafter may be referred to as a "steering angular speed signal") to the acceleration suppression control content computing unit 10I.

The shift position computing unit 10E determines a current shift position based on a shift position signal input from the shift position sensor 20. Then, the shift position computing unit 10E outputs an information signal including the computed current shift position (hereinafter may be referred to as a "current shift position signal") to the acceleration suppression control content computing unit 10I.

Based on a brake opening degree signal input from the brake operation detection sensor 22, the brake pedal operation information computing unit 10F computes a depression amount of the brake pedal 30 by using a state of a depression amount being "0" as a reference. Then, the brake pedal operation information computing unit 10F outputs an information signal including the computed depression amount of the brake pedal 30 (hereinafter may be referred to as a "braking-side depression amount signal") to the acceleration suppression control content computing unit 10I.

Based on an accelerator opening degree signal input from the accelerator operation detection sensor 24, the accelerator operation amount computing unit 10G computes a depression amount of the accelerator pedal 32 by using a state of a depression amount being "0" as a reference. Then, the accelerator operation amount computing unit 10G outputs an information signal including the computed depression amount of the accelerator pedal 32 (hereinafter may be referred to as a "driving-side depression amount signal") to the acceleration suppression control content computing unit 10I, the acceleration suppression command value computing unit 10J, and the target throttle opening degree computing unit 10K.

The accelerator operation speed computing unit 10H computes an operation speed of the accelerator pedal 32 by differentiating an opening degree of the accelerator pedal 32 included in an accelerator opening degree signal input from the accelerator operation detection sensor 24. Then, the accelerator operation speed computing unit 10H outputs an information signal including the computed operation speed of the accelerator pedal 32 (hereinafter may be referred to as an "accelerator operation speed signal") to the acceleration suppression command value computing unit 10J.

The acceleration suppression control content computing unit 10I receives input of the above-described various information signals (the bird's-eye view image signal, the vehicle speed computed value signal, the steering angle signal, the steering angular speed signal, the current shift position signal, the braking-side depression amount signal, the driving-side depression amount signal, the own vehicle position signal, and the travel road information signal). Then, based on the input various information signals, the acceleration suppression control content computing unit 10I computes a later-described acceleration suppression operating condition determination result, acceleration suppression control start timing, and acceleration suppression control amount. Further, the acceleration suppression control content computing unit 10I outputs an information signal including these computed parameters to the acceleration suppression command value computing unit 10J.

A detailed configuration of the acceleration suppression control content computing unit 10I and processes implemented by the acceleration suppression control content computing unit 10I will be described later.

The acceleration suppression command value computing unit 10J receives input of the above-described driving-side depression amount signal and accelerator operation speed signal and input of a later-described acceleration suppression operating condition determination result signal, acceleration suppression control start timing signal, and acceleration suppression control amount signal. Then, the acceleration suppression command value computing unit 10J computes an acceleration suppression command value as a command value for reducing acceleration of the own vehicle V which is generated depending on a depression amount (acceleration operation amount) of the accelerator pedal 32. Further, the acceleration suppression command value computing unit 10J outputs an information signal including the computed acceleration suppression command value (hereinafter may be referred to as an "acceleration suppression command value signal") to the target throttle opening degree computing unit 10K.

Further, depending on the content of the input acceleration suppression operating condition determination result signal, the acceleration suppression command value computing unit 10J computes a suppression-present acceleration suppression command value as a command value for use in a suppression-present acceleration suppression control which is a control to suppress a later-described acceleration suppression control. Further, the acceleration suppression command value computing unit 10J outputs an information signal including the computed suppression-present acceleration suppression command value (hereinafter may be referred to as a "suppression-present acceleration suppression command value signal") to the target throttle opening degree computing unit 10K.

Further, depending on the content of the input acceleration suppression operating condition determination result signal, the acceleration suppression command value computing unit 10J computes a normal acceleration command value as a command value for use in a normal acceleration control. Further, the acceleration suppression command value computing unit 10J outputs an information signal including the computed normal acceleration command value (hereinafter may be referred to as a "normal acceleration command value signal") to the target throttle opening degree computing unit 10K. Processes implemented by the acceleration suppression command value computing unit 10J will be described later.

The target throttle opening degree computing unit 10K receives input of the driving-side depression amount signal and the acceleration suppression command value signal or the normal acceleration command value signal. Then, based on the depression amount of the accelerator pedal 32 and the acceleration suppression command value or the normal acceleration command value, the target throttle opening degree computing unit 10K computes a target throttle opening degree as a throttle opening degree corresponding to the depression amount of the accelerator pedal 32 or the acceleration suppression command value. Further, the target throttle opening degree computing unit 10K outputs an information signal including the computed target throttle opening degree (hereinafter may be referred to as a "target throttle opening degree signal") to the engine controller 12.

When the acceleration suppression command value or the suppression-present acceleration suppression command value includes a later-described acceleration suppression control start timing command value, the target throttle opening degree computing unit 10K outputs the target throttle opening degree signal to the engine controller 12 based on a later-described acceleration suppression control start timing. Processes implemented by the target throttle opening degree computing unit 10K will be described later.

(Configuration of Acceleration Suppression Control Content Computing Unit 10I)

Next, using FIGS. 3 and 4 while referring to FIGS. 1 and 2, a detailed configuration of the acceleration suppression control content computing unit 10I will be described.

Figure 3:
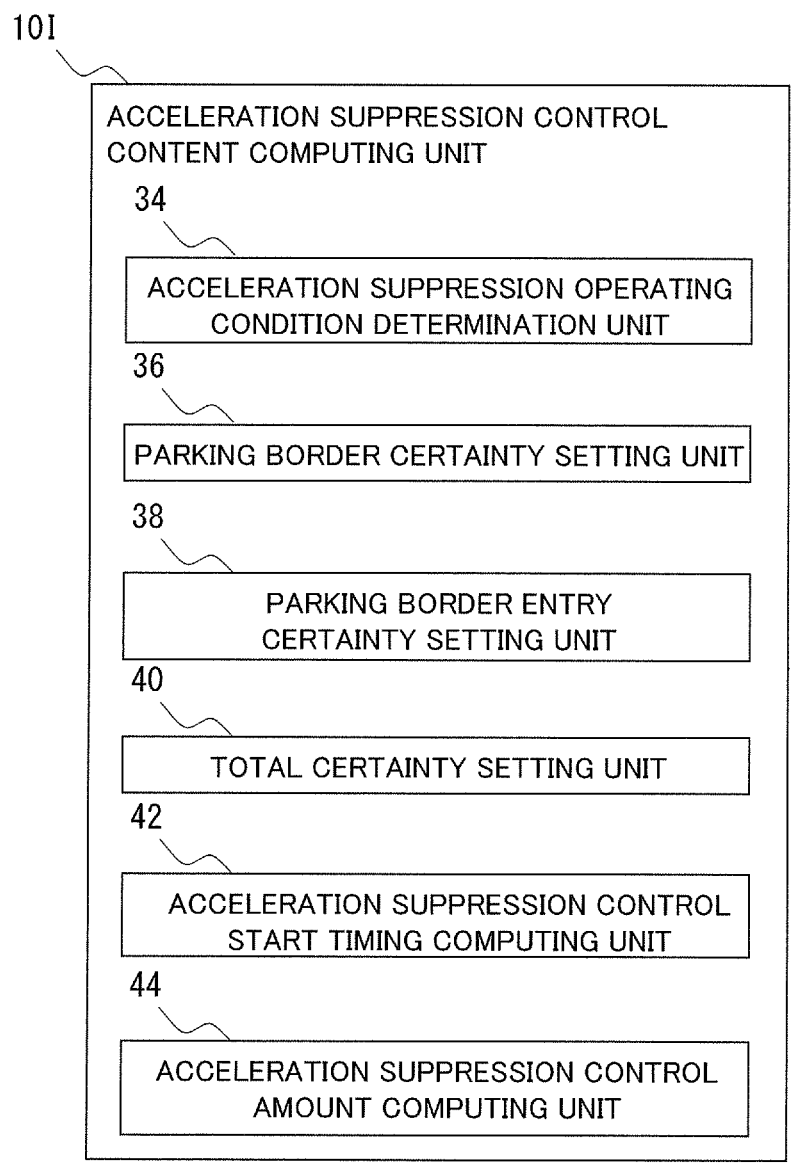
FIG. 3 is a block diagram showing a configuration of an acceleration suppression control content computing unit.

FIG. 3 is a block diagram showing a configuration of the acceleration suppression control content computing unit 10I. As shown in FIG. 3, the acceleration suppression control content computing unit 10I includes an acceleration suppression operating condition determination unit 34, a parking frame certainty setting unit 36, a parking frame entry certainty setting unit 38, and a total certainty setting unit 40. In addition, the acceleration suppression control content computing unit 10I includes an acceleration suppression control start timing computing unit 42 and an acceleration suppression control amount computing unit 44.

The acceleration suppression operating condition determination unit 34 determines whether or not a condition for operating an acceleration suppression control is established, and outputs an information signal including a result of the determination (hereinafter may be referred to as an "acceleration suppression operating condition determination result signal") to the acceleration suppression command value computing unit 10J. Herein, the acceleration suppression control is a control to set an acceleration command value, that accelerates the vehicle V depending on a depression amount of the accelerator pedal 32, to a value that provides a lower acceleration than normal. In this embodiment, the greater the acceleration command value, the greater the acceleration of the vehicle V to be generated, and therefore, the acceleration suppression control is a control to reduce the acceleration command value that accelerates the vehicle V depending on a depression amount of the accelerator pedal 32.

In this embodiment, in addition to determining whether or not the condition for operating the acceleration suppression control is established, it is determined whether or not a condition for operating a suppression-present acceleration suppression control is established. Herein, the suppression-present acceleration suppression control is a control to stop the acceleration suppression control (perform a normal acceleration control) or to suppress a reducing amount of an acceleration command value in the acceleration suppression control (set it smaller than normal). In this embodiment, it is configured that a driver can select and set in advance one of a stopping mode to stop an acceleration suppression control and a suppression mode to suppress a reducing amount of an acceleration suppression control. The configuration is not limited thereto and may be such that one of them is fixedly set.

The process of determining whether or not the condition for operating the acceleration suppression control is established and the process of determining whether or not the condition for operating the suppression-present acceleration suppression control is established, which are implemented by the acceleration suppression operating condition determination unit 34, will be described later.

The parking frame certainty setting unit 36 sets a parking frame certainty as a certainty of the presence of a parking frame in a travel direction of the own vehicle V. Then, the parking frame certainty setting unit 36 outputs an information signal including the set parking frame certainty (hereinafter may be referred to as a "parking frame certainty signal") to the total certainty setting unit 40.

Herein, the parking frame certainty setting unit 36 refers to various information included in a bird's-eye view image signal, a vehicle speed computed value signal, a current shift position signal, an own vehicle position signal, and a travel road information signal and sets a parking frame certainty.

Figure 4:
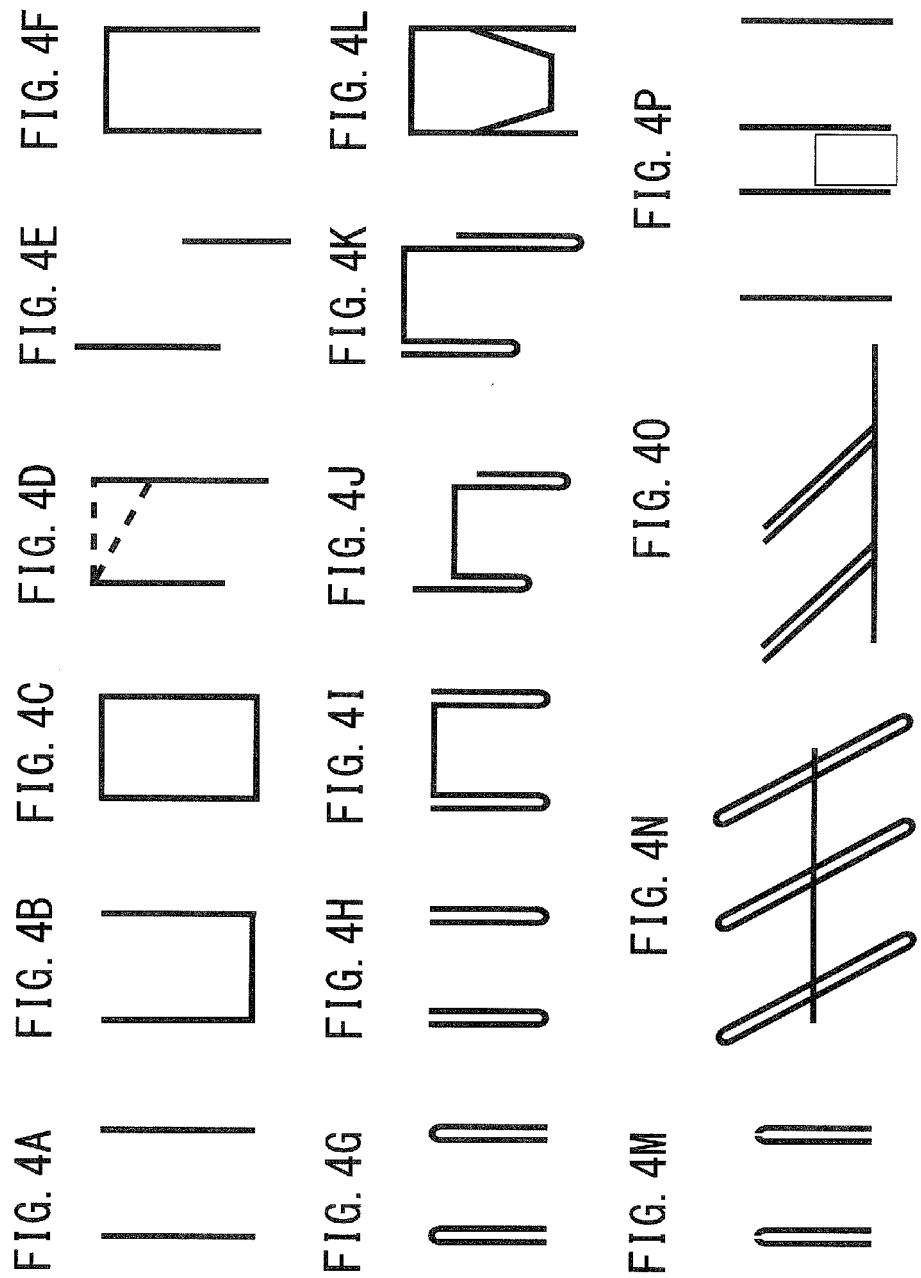
FIG. 4 is a diagram showing patterns of parking frames each being an object of a parking frame certainty set by a parking frame certainty setting unit.

For example, as shown in FIG. 4, there are a plurality of patterns each being a parking frame as an object of a certainty set by the parking frame certainty setting unit 36. FIG. 4 is a diagram showing patterns of parking frames each being an object of a parking frame certainty set by the parking frame certainty setting unit 36.

Further, the parking frame certainty setting unit 36 detects an intersection lying ahead in the vehicle longitudinal direction of the own vehicle V. Upon detecting the intersection, the parking frame certainty setting unit 36 detects a travel distance of the own vehicle V from the detection. For example, based on a vehicle speed computed value signal, the parking frame certainty setting unit 36 detects a travel distance by integrating a vehicle speed from a time point of detecting the intersection. Then, based on a travel distance at a vehicle speed less than or equal to a preset threshold vehicle speed of the own vehicle V from the time point of detecting the intersection, the parking frame certainty setting unit 36 implements a process of excluding, as a candidate for a parking frame line (hereinafter may be referred to as a "parking frame line candidate"), a line which is detected from a bird's-eye view image as being located on a road surface. In addition, the parking frame certainty setting unit 36 implements a process of setting a suppression control suppression flag for use in determining whether or not to implement a process of stopping or suppressing an acceleration suppression control process, and so on. Details of the process of setting the parking frame certainty, implemented by the parking frame certainty setting unit 36, will be described later.

The parking frame entry certainty setting unit 38 sets a parking frame entry certainty as a certainty that the own vehicle V enters a parking frame. Then, the parking frame entry certainty setting unit 38 outputs an information signal including the set parking frame entry certainty (hereinafter may be referred to as a "parking frame entry certainty signal") to the total certainty setting unit 40.

Herein, the parking frame entry certainty setting unit 38 refers to various information included in a bird's-eye view image signal, a vehicle speed computed value signal, a current shift position signal, and a steering angle signal and sets a parking frame entry certainty. The process of setting the parking frame entry certainty, implemented by the parking frame entry certainty setting unit 38, will be described later.

The total certainty setting unit 40 receives input of the parking frame certainty signal and the parking frame entry certainty signal and sets a total certainty as a certainty corresponding to the parking frame certainty and the parking frame entry certainty. Then, the total certainty setting unit 40 outputs an information signal including the set total certainty (hereinafter may be referred to as a "total certainty signal") to the acceleration suppression control start timing computing unit 42 and the acceleration suppression control amount computing unit 44. The process of setting the total certainty, implemented by the total certainty setting unit 40, will be described later.

The acceleration suppression control start timing computing unit 42 computes an acceleration suppression control start timing as a timing to start an acceleration suppression control. Then, the acceleration suppression control start timing computing unit 42 outputs an information signal including the computed acceleration suppression control start timing (hereinafter may be referred to as an "acceleration suppression control start timing signal") to the acceleration suppression command value computing unit 10J.

Herein, the acceleration suppression control start timing computing unit 42 refers to various information included in a total certainty signal, a braking-side depression amount signal, a vehicle speed computed value signal, a current shift position signal, and a steering angle signal and computes an acceleration suppression control start timing.

The process of computing the acceleration suppression control start timing, implemented by the acceleration suppression control start timing computing unit 42, will be described later.

The acceleration suppression control amount computing unit 44 computes an acceleration suppression control amount as a control amount for reducing an acceleration command value which corresponds to a depression amount of the accelerator pedal 32. Then, the acceleration suppression control amount computing unit 44 outputs an information signal including the computed acceleration suppression control amount (hereinafter may be referred to as an "acceleration suppression control amount signal") to the acceleration suppression command value computing unit 10J.

Herein, the acceleration suppression control amount computing unit 44 refers to various information included in a total certainty signal, a braking-side depression amount signal, a vehicle speed computed value signal, a current shift position signal, and a steering angle signal and computes an acceleration suppression control amount. The process of computing the acceleration suppression control amount, implemented by the acceleration suppression control amount computing unit 44, will be described later.

(Process Implemented by Acceleration Suppression Control Content Computing Unit 10I)

Next, using FIGS. 5 to 13 while referring to FIGS. 1 to 4, processes implemented by the acceleration suppression control content computing unit 10I will be described.

Using FIGS. 5 and 6 while referring to FIGS. 1 to 4, a process of determining whether or not a condition for operating an acceleration suppression control (hereinafter may be referred to as an "acceleration suppression operating condition") is established, implemented by the acceleration suppression operating condition determination unit 34, will be described.

Figure 5:
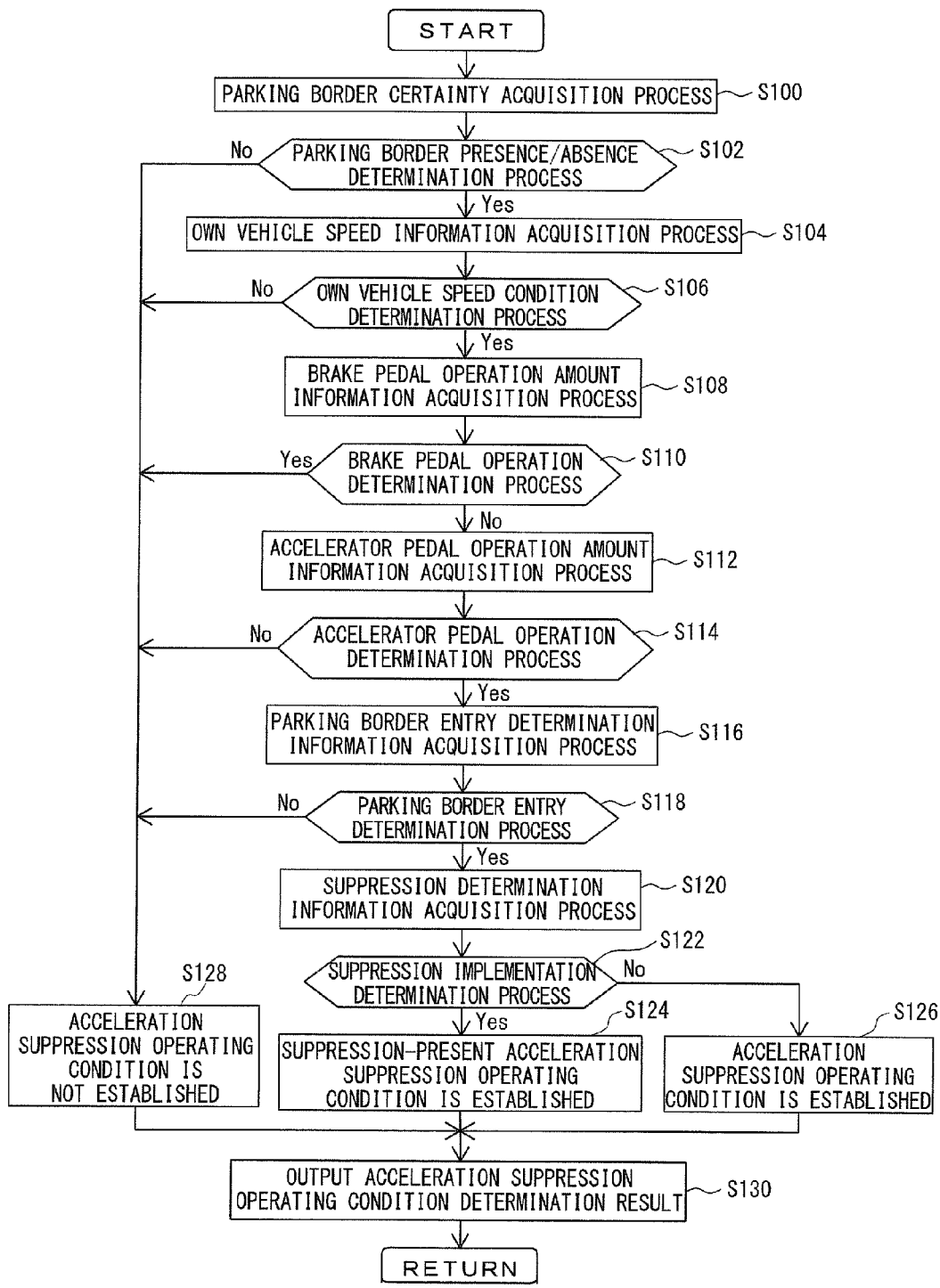
FIG. 5 is a flowchart showing a process of determining whether or not an acceleration suppression operating condition is established, implemented by an acceleration suppression operating condition determination unit.

FIG. 5 is a flowchart showing a process of determining whether or not an acceleration suppression operating condition is established, implemented by the acceleration suppression operating condition determination unit 34. The acceleration suppression operating condition determination unit 34 implements the following process per preset sampling time (e.g. 10 [msec]).

As shown in FIG. 5, when the acceleration suppression operating condition determination unit 34 starts (START) a process, first, a process is implemented at step S100 to acquire a parking frame certainty set by the parking frame certainty setting unit 36 ("PARKING FRAME CERTAINTY ACQUISITION PROCESS" shown in the figure). After the process of acquiring the parking frame certainty is implemented at step S100, the process implemented by the acceleration suppression operating condition determination unit 34 proceeds to step S102.

At step S102, a process is implemented in which, based on the parking frame certainty acquired at step S100, it is determined whether or not a parking frame is present ("PARKING FRAME PRESENCE/ABSENCE DETERMINATION PROCESS" shown in the figure). In this embodiment, the process of determining the presence or absence of a parking frame is implemented based on the parking frame certainty. Specifically, when it is determined that the parking frame certainty is a preset minimum value (level 0), it is determined that, for example, there is no parking frame in a preset distance or area with respect to the own vehicle V ("No" shown in the figure). In this case, the process implemented by the acceleration suppression operating condition determination unit 34 proceeds to step S128.

On the other hand, when it is determined that the parking frame certainty is a value other than the preset minimum value, it is determined that there is a parking frame in the preset distance or area with respect to the own vehicle V ("Yes" shown in the figure). In this case, the process implemented by the acceleration suppression operating condition determination unit 34 proceeds to step S104.

At step S104, a process is implemented to acquire a vehicle speed of the own vehicle V by referring to a vehicle speed computed value signal input from the own vehicle speed computing unit 10B ("OWN VEHICLE SPEED INFORMATION ACQUISITION PROCESS" shown in the figure). After the process of acquiring the vehicle speed of the own vehicle V is implemented at step S104, the process implemented by the acceleration suppression operating condition determination unit 34 proceeds to step S106.

At step S106, a process is implemented in which, based on the vehicle speed acquired at step S104, it is determined whether or not a condition that the vehicle speed of the own vehicle V is less than a preset threshold vehicle speed is established ("OWN VEHICLE SPEED CONDITION DETERMINATION PROCESS" shown in the figure). In this embodiment, as one example, a description will be given of the case where the threshold vehicle speed is set to 15 [km/h].

When it is determined at step S106 that the condition of the vehicle speed of the own vehicle V being less than the threshold vehicle speed is established ("Yes" shown in the figure), the process implemented by the acceleration suppression operating condition determination unit 34 proceeds to step S108.

On the other hand, when it is determined at step S106 that the condition of the vehicle speed of the own vehicle V being less than the threshold vehicle speed is not established ("No" shown in the figure), the process implemented by the acceleration suppression operating condition determination unit 34 proceeds to step S128.

At step S108, a process is implemented to acquire information about a depression amount (braking force operation amount) of the brake pedal 30 by referring to a braking-side depression amount signal input from the brake pedal operation information computing unit 10F ("BRAKE PEDAL OPERATION AMOUNT INFORMATION ACQUISITION PROCESS" shown in the figure). After the process of acquiring the information about the depression amount (braking force operation amount) of the brake pedal 30 is implemented at step S108, the process implemented by the acceleration suppression operating condition determination unit 34 proceeds to step S110.

At step S110, a process is implemented in which, based on the depression amount of the brake pedal 30 acquired at step S108, it is determined whether or not the brake pedal 30 is operated ("BRAKE PEDAL OPERATION DETERMINATION PROCESS" shown in the figure).

When it is determined at step S110 that the brake pedal 30 is not operated ("No" shown in the figure), the process implemented by the acceleration suppression operating condition determination unit 34 proceeds to step S112.

On the other hand, when it is determined at step S110 that the brake pedal 30 is operated ("Yes" shown in the figure), the process implemented by the acceleration suppression operating condition determination unit 34 proceeds to step S128.

At step S112, a process is implemented to acquire information about a depression amount (acceleration operation amount) of the accelerator pedal 32 by referring to a driving-side depression amount signal input from the accelerator operation amount computing unit 10G ("ACCELERATOR PEDAL OPERATION AMOUNT INFORMATION ACQUISITION PROCESS" shown in the figure). After the process of acquiring the information about the depression amount (acceleration operation amount) of the accelerator pedal 32 is implemented at step S112, the process implemented by the acceleration suppression operating condition determination unit 34 proceeds to step S114.

At step S114, a process is implemented to determine whether or not a condition that the depression amount (acceleration operation amount) of the accelerator pedal 32 is greater than or equal to a preset threshold accelerator operation amount is established ("ACCELERATOR PEDAL OPERATION DETERMINATION PROCESS" shown in the figure). Herein, the process of step S114 is implemented based on the depression amount of the accelerator pedal 32 acquired at step S112.

In this embodiment, as one example, a description will be given of the case where the threshold accelerator operation amount is set to an operation amount corresponding to an opening degree of 3[%] of the accelerator pedal 32.

When it is determined at step S114 that the condition of the depression amount (acceleration operation amount) of the accelerator pedal 32 being greater than or equal to the threshold accelerator operation amount is established ("Yes" shown in the figure), the process implemented by the acceleration suppression operating condition determination unit 34 proceeds to step S116.

On the other hand, when it is determined at step S114 that the condition of the depression amount (acceleration operation amount) of the accelerator pedal 32 being greater than or equal to the threshold accelerator operation amount is not established ("No" shown in the figure), the process implemented by the acceleration suppression operating condition determination unit 34 proceeds to step S128.

At step S116, a process is implemented to acquire information for use in determining whether or not the own vehicle V will enter a parking frame ("PARKING FRAME ENTRY DETERMINATION INFORMATION ACQUISITION PROCESS" shown in the figure). Herein, in this embodiment, as one example, a description will be given of the case where whether or not the own vehicle V will enter a parking frame is determined based on a steering angle of the steering wheel 28, an angle formed between the own vehicle V and the parking frame, and a distance between the own vehicle V and the parking frame. After the process of acquiring the information for use in determining whether or not the own vehicle V will enter the parking frame is implemented at step S116, the process implemented by the acceleration suppression operating condition determination unit 34 proceeds to step S118.

Herein, a specific example of the process implemented at step S116 will be described. At step S116, a rotation angle (steering angle) of the steering wheel 28 is acquired by referring to a steering angle signal input from the steering angle computing unit 10C. In addition, based on a bird's-eye view image around the own vehicle V included in a bird's-eye view image signal input from the surrounding environment recognition information computing unit 10A, an angle $\alpha$ formed between the own vehicle V and a parking frame L0 and a distance D between the own vehicle V and the parking frame L0 are acquired.

Figure 6:
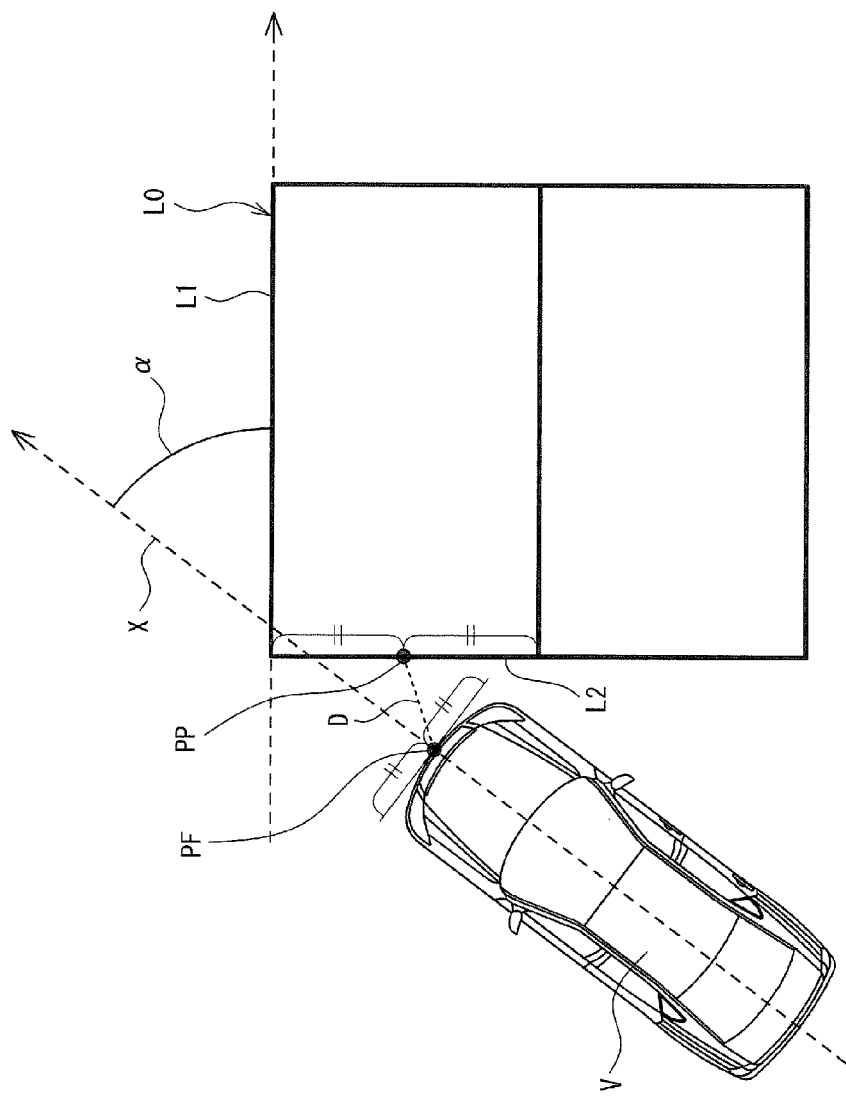
FIG. 6 is a diagram explaining an own vehicle, a parking frame, and a distance between the own vehicle and the parking frame.

Herein, for example, as shown in FIG. 6, the angle $\alpha$ is an absolute value of an angle of intersection between a straight line X and a frame line L1 or a line on the parking frame L0 side. FIG. 6 is a diagram explaining the own vehicle V, the parking frame L0, and the distance D between the own vehicle V and the parking frame L0.

The straight line X is a straight line passing through the center of the own vehicle V and extending in the longitudinal direction of the own vehicle V (a straight line extending in a travel direction). The frame line L1 is a frame line of a parking frame L0 portion that becomes parallel or approximately parallel to the longitudinal direction of the own vehicle V when parking is completed in the parking frame L0. The line on the parking frame L0 side is a line, defined by an extended line of L1, on the parking frame L0 side.

Further, for example, as shown in FIG. 6, the distance D is a distance between a center point PF of a front end surface of the own vehicle V and a center point PP of an entrance L2 of the parking frame L0. However, the distance D is set to a negative value after the front end surface of the own vehicle V passes through the entrance L2 of the parking frame L0. Alternatively, the distance D may be set to zero after the front end surface of the own vehicle V passes through the entrance L2 of the parking frame L0.

Herein, the position on the own vehicle V side for specifying the distance D is not limited to the center point PF. For example, a position set in advance on the own vehicle V and a preset position of the entrance L2 may be used. In this case, the distance D is a distance between the position set in advance on the own vehicle V and the preset position of the entrance L2.

As described above, at step S116, the steering angle, the angle $\alpha$ between the own vehicle V and the parking frame L0, and the distance D between the own vehicle V and the parking frame L0 are acquired as the information for determining whether or not the own vehicle V will enter the parking frame L0.

At step S118, a process is implemented in which, based on the information acquired at step S116, it is determined whether or not the own vehicle V will enter the parking frame ("PARKING FRAME ENTRY DETERMINATION PROCESS" shown in the figure).

When it is determined at step S118 that the own vehicle V will not enter the parking frame ("No" shown in the figure), the process implemented by the acceleration suppression operating condition determination unit 34 proceeds to step S128.

On the other hand, when it is determined at step S118 that the own vehicle V will enter the parking frame ("Yes" shown in the figure), the process implemented by the acceleration suppression operating condition determination unit 34 proceeds to step S120.

Herein, a specific example of the process implemented at step S118 will be described. At step S118, if, for example, all of the following three conditions (A1 to A3) are satisfied, it is determined that the own vehicle V will enter the parking frame.

Condition A1: The time having elapsed from when the steering angle detected at step S116 became a value greater than or equal to a preset steering angle value (e.g. 45 [deg]) is within a preset time (e.g. 20 [sec]).

Condition A2: The angle cc between the own vehicle V and the parking frame L0 is less than or equal to a preset angle (e.g. 40 [deg]).

Condition A3: The distance D between the own vehicle V and the parking frame L0 is less than or equal to a preset distance (e.g. 3 [m]).

As the process of determining whether or not the own vehicle V will enter the parking frame, the process which is implemented by the parking frame entry certainty setting unit 38 when setting a parking frame entry certainty may be used.

A process for use in determining whether or not the own vehicle V will enter a parking frame is not limited to a process using a plurality of conditions as described above and use may be made of a process that makes a determination based on one or more of the above-described three conditions. Alternatively, use may be made of a process that uses a vehicle speed of the own vehicle V to determine whether or not the own vehicle V will enter a parking frame.

At step S120, a process is implemented to acquire information for use in determining whether or not to implement a process of suppressing an acceleration suppression control ("SUPPRESSION DETERMINATION INFORMATION ACQUISITION PROCESS" shown in the figure). After the process of acquiring the information for use in determining whether or not to implement the process of suppressing the acceleration suppression control is implemented at step S120, the process implemented by the acceleration suppression operating condition determination unit 34 proceeds to step S122.

In this embodiment, setting information of a suppression control suppression flag set by the parking frame certainty setting unit 36 is acquired.

At step S122, a process is implemented in which, based on the setting information of the suppression control suppression flag acquired at step S120, it is determined whether or not to implement the process of suppressing the acceleration suppression control ("SUPPRESSION IMPLEMENTATION DETERMINATION PROCESS" shown in the figure).

In this embodiment, the process of determining whether or not to implement the process of suppressing the acceleration suppression control is implemented based on a set value (ON, OFF) of the suppression control suppression flag.

Specifically, when the set value is determined to be a value indicating ON (e.g. "1"), it is determined to implement the process of suppressing the acceleration suppression control ("Yes" shown in the figure). In this case, the process implemented by the acceleration suppression operating condition determination unit 34 proceeds to step S124.

On the other hand, when the set value is determined to be a value indicating OFF (e.g. "0"), it is determined not to implement the process of suppressing the acceleration suppression control ("No" shown in the figure). In this case, the process implemented by the acceleration suppression operating condition determination unit 34 proceeds to step S126.

At step S124, a process is implemented to produce an acceleration suppression operating condition determination result signal as an information signal including a determination result that a suppression-present acceleration suppression operating condition is established ("SUPPRESSION-PRESENT ACCELERATION SUPPRESSION OPERATING CONDITION IS ESTABLISHED" shown in the figure). After the process of producing the determination result signal as the information signal including the determination result that the suppression-present acceleration suppression operating condition is established is implemented at step S124, the process implemented by the acceleration suppression operating condition determination unit 34 proceeds to step S130.

At step S126, a process is implemented to produce an acceleration suppression operating condition determination result signal as an information signal including a determination result that an acceleration suppression control operating condition is established ("ACCELERATION SUPPRESSION OPERATING CONDITION IS ESTABLISHED" shown in the figure). After the process of producing the acceleration suppression operating condition determination result signal including the determination result that the acceleration suppression control operating condition is established is implemented at step S126, the process implemented by the acceleration suppression operating condition determination unit 34 proceeds to step S130.

At step S128, a process is implemented to produce an acceleration suppression operating condition determination result signal as an information signal including a determination result that an acceleration suppression control operating condition is not established ("ACCELERATION SUPPRESSION OPERATING CONDITION IS NOT ESTABLISHED" shown in the figure). After the process of producing the acceleration suppression operating condition determination result signal including the determination result that the acceleration suppression control operating condition is not established is implemented at step S128, the process implemented by the acceleration suppression operating condition determination unit 34 proceeds to step S130.

At step S130, a process is implemented to output the acceleration suppression operating condition determination result signal produced at step S124, step S126, or step S128 to the acceleration suppression command value computing unit 10J ("OUTPUT ACCELERATION SUPPRESSION OPERATING CONDITION DETERMINATION RESULT" shown in the figure). After the process of outputting the acceleration suppression operating condition determination result signal to the acceleration suppression command value computing unit 10J is implemented at step S130, the process implemented by the acceleration suppression operating condition determination unit 34 returns (RETURN) to the process of step S100.

Figure 7:
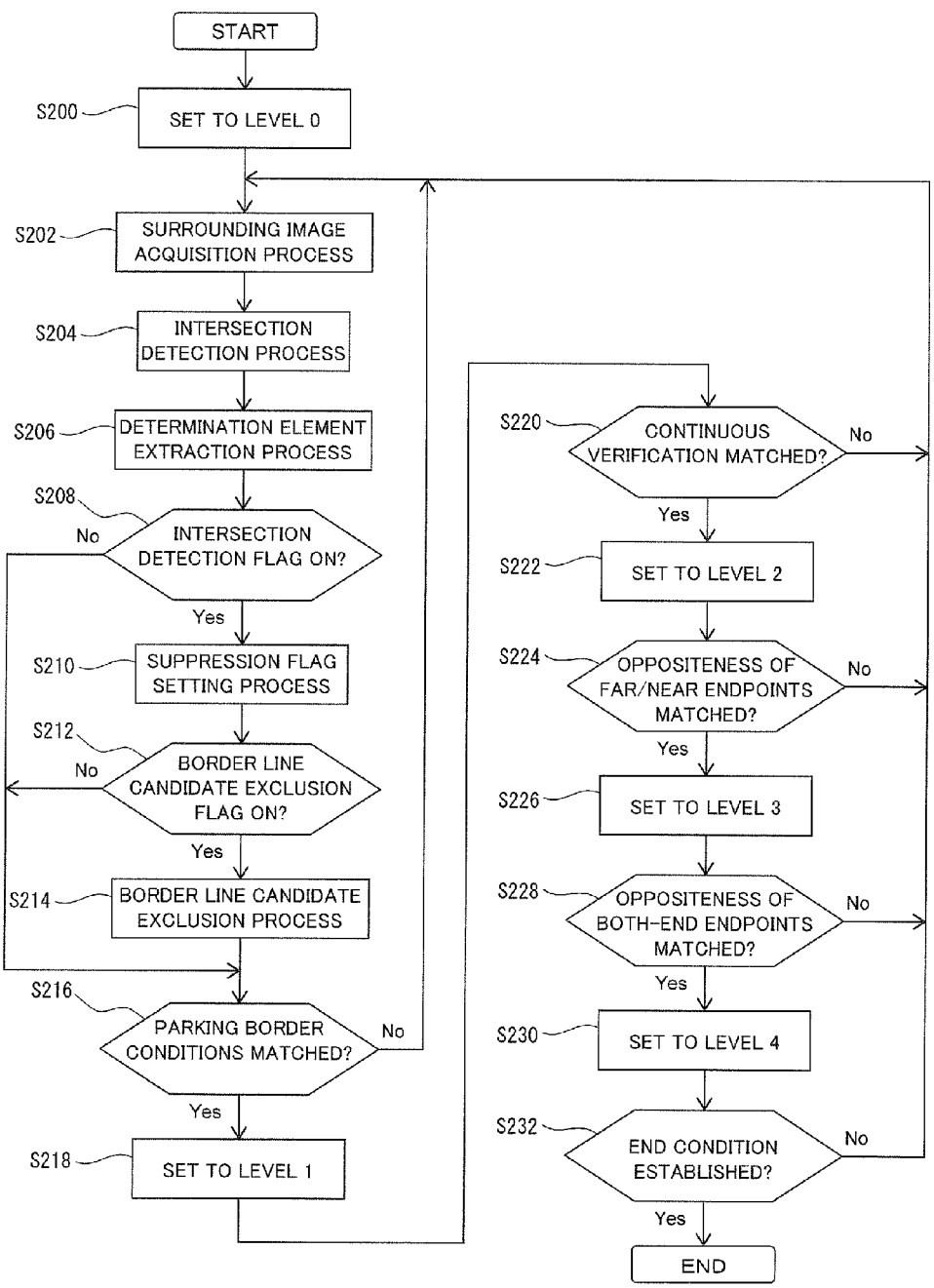
FIG. 7 is a flowchart showing a process of setting a parking frame certainty, implemented by a parking frame certainty setting unit.

Using FIGS. 7 to 9 while referring to FIGS. 1 to 6, a process of setting a parking frame certainty, implemented by the parking frame certainty setting unit 36, will be described. FIG. 7 is a flowchart showing a process of setting a parking frame certainty, implemented by the parking frame certainty setting unit 36.

As shown in FIG. 7, when the parking frame certainty setting unit 36 starts (START) a process, first, a process is implemented at step S200 to set the level of the parking frame certainty to a minimum value (level 0) ("SET TO LEVEL 0" shown in the figure). After the process of setting the parking frame certainty to the level 0 is implemented at step S200, the process implemented by the parking frame certainty setting unit 36 proceeds to step S202.

At step S202, a process is implemented to acquire a bird's-eye view image around the own vehicle V included in a bird's-eye view image signal input from the surrounding environment recognition information computing unit 10A ("SURROUNDING IMAGE ACQUISITION PROCESS" shown in the figure). After the process of acquiring the bird's-eye view image around the own vehicle V is implemented at step S202, the process implemented by the parking frame certainty setting unit 36 proceeds to step S204.

At step S204, a process of detecting an intersection lying ahead of the own vehicle V is implemented ("INTERSECTION DETECTION PROCESS" shown in the figure). After the process of detecting the intersection is implemented at step S204, the process implemented by the parking frame certainty setting unit 36 proceeds to step S206.

Herein, using FIG. 8, a specific example of the process implemented at step S204 will be described. FIG. 8 is a flowchart showing a process of detecting an intersection, implemented by the parking frame certainty setting unit 36.

Figure 8:
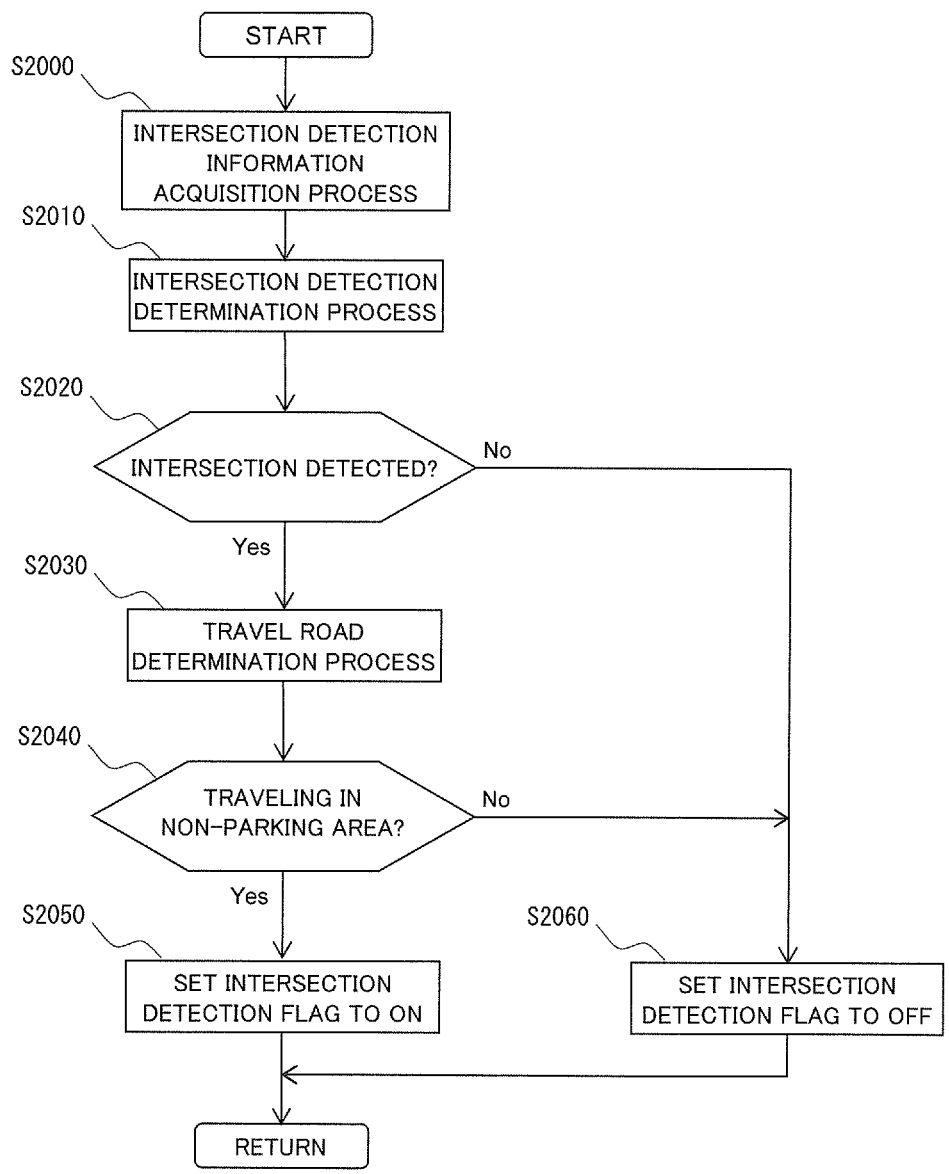
FIG. 8 is a flowchart showing a process of detecting an intersection, implemented by the parking frame certainty setting unit 36.

When the parking frame certainty setting unit 36 starts (START) a process at step S206, first, as shown in FIG. 8, a process is implemented at step S2000 to acquire information for use in detecting an intersection ("INTERSECTION DETECTION INFORMATION ACQUISITION PROCESS" shown in the figure). After the process of acquiring the information for use in detecting the intersection is implemented at step S2000, the process implemented by the parking frame certainty setting unit 36 proceeds to step S2010.

Herein, a specific example of the process implemented at step S2000 will be described. At step S2000, for example, the following three information are acquired. Firstly, an analysis is performed by image processing to see whether or not there are marking lines indicating a pedestrian crossing on a road surface in a bird's-eye view image ahead of the own vehicle V. Then, based on a result of this analysis, information indicating whether or not there is a pedestrian crossing ahead of the own vehicle V (hereinafter may be referred to as "pedestrian crossing presence/absence information") is acquired. This analysis process is performed, for example, by using a known image processing technology such as pattern matching. Specifically, when it is determined based on this analysis result that there is a pedestrian crossing ahead of the own vehicle V, pedestrian crossing presence/absence information including information indicative of the presence of a pedestrian crossing is produced. On the other hand, when it is determined based on this analysis result that there is no pedestrian crossing ahead of the own vehicle V, pedestrian crossing presence/absence information including information indicative of the absence of a pedestrian crossing is produced.

Secondly, an analysis is performed by image processing to see whether or not there is a road marking line or a road edge line (hereinafter may be referred to as a "curved line" without discrimination) satisfying a preset bending condition on a road surface in a bird's-eye view image ahead of the own vehicle V. Then, based on a result of this analysis, information indicating whether or not there is a curved line (hereinafter may be referred to as "curved line presence/absence information") is acquired. This analysis process is performed, for example, by numerically analyzing the curvature or the like of a curved line that can be extracted from an image, or by using a known image processing technique such as pattern matching. Specifically, when it is determined based on this analysis result that there is a curved line ahead of the own vehicle V, curved line presence/absence information including information indicative of the presence of a curved line is produced. On the other hand, when it is determined based on this analysis result that there is no curved line ahead of the own vehicle V, curved line presence/absence information including information indicative of the absence of a curved line is produced.

Herein, the bending condition is, for example, a condition defining features of curves for use in determining whether or not there is agreement with a curve present at an intersection such as a curve in a preset curvature range.

Thirdly, by referring to a braking-side depression amount signal input from the brake pedal operation information computing unit 10F, an operation pattern of the brake pedal 30 (hereinafter may be referred to as a "braking operation pattern") of the own vehicle V is detected. Then, it is determined whether or not the detected braking operation pattern agrees with a preset operation pattern of the brake pedal 30 of the vehicle at an intersection. Then, based on a result of this determination, information indicating whether or not the braking operation pattern of the own vehicle V agrees with the braking operation pattern at the intersection (hereinafter may be referred to as "braking operation pattern agreement determination information") is acquired. Specifically, if it is determined based on this determination result that there is agreement, braking operation pattern agreement determination information including information indicative of agreement is produced. On the other hand, when it is determined based on this determination result that there is no agreement, braking operation pattern agreement determination information including information indicative of disagreement is produced.

Herein, the preset braking operation pattern at the intersection is, for example, such as a braking operation pattern in which an operation amount of the brake pedal 30 greater than or equal to an operation amount that stops the own vehicle V continues for a preset time (e.g. 10 seconds) or more. Alternatively, it may be configured that, by learning a braking operation pattern at an intersection per driver, an appropriate braking operation pattern is set per driver.

At step S2010, a process is implemented in which, based on the information for detecting the intersection acquired at step S2000, it is determined whether or not an intersection is detected ("INTERSECTION DETECTION DETERMINATION PROCESS" shown in the figure). After the process of determining whether or not the intersection is detected is implemented at step S2010, the process implemented by the parking frame certainty setting unit 36 proceeds to step S2020.

Herein, a specific example of the process implemented at step S2010 will be described. At step S2010, a process is implemented in which, based on "pedestrian crossing presence/absence information", "curved line presence/absence information", and "braking operation pattern agreement determination information" acquired at step S2000, it is determined whether or not an intersection is detected. For example, it is determined whether or not at least one of "pedestrian crossing is present", "curved line is present", and "braking operation pattern is in agreement" is satisfied.

At step S2020, a process is implemented in which, based on a result of the determination at step S2010, it is determined whether or not an intersection is detected ("INTERSECTION DETECTED?" shown in the figure). When it is determined at step S2020 that the intersection is detected ("Yes" shown in the figure), the process implemented by the parking frame certainty setting unit 36 proceeds to step S2030.

On the other hand, when it is determined at step S2020 that no intersection is detected ("No" shown in the figure), the process implemented by the parking frame certainty setting unit 36 proceeds to step S2060.

At step S2030, a process is implemented to determine whether an area in which the own vehicle V is traveling is a preset parking area or an area other than the parking area (hereinafter may be referred to as a "non-parking area") ("TRAVEL ROAD DETERMINATION PROCESS" shown in the figure). After the process of determining whether or not the own vehicle V is traveling in the non-parking area is implemented at step S2030, the process implemented by the parking frame certainty setting unit 36 proceeds to step S2040.

Herein, a specific example of the process implemented at step S2030 will be described. For example, the following five determination processes are implemented as the process of determining whether or not the own vehicle V is traveling in the non-parking area.

The first is to determine whether or not the vehicle speed of the own vehicle V is greater than or equal to 30 [km/h].

The second is to determine whether or not the continuous travel distance of the own vehicle V is greater than or equal to 100 [m].

The third is to determine whether or not a line having a length greater than or equal to a preset first line length distance threshold value (e.g. a length corresponding to an actual distance of 15 [m]) is included in lines extracted as candidates for parking frame lines.

The fourth is to determine whether or not a pair of lines having a length greater than or equal to a preset second line length distance threshold value (e.g. a length corresponding to an actual distance of 7 [m]) are included in pairs of two lines adjacent to each other in a preset first inter-line distance range (e.g. a length corresponding to an actual distance of 3 to 5 [m]) in lines extracted as candidates for parking frame lines.

The fifth is to determine whether or not a pair of lines having a length greater than or equal to a preset third line length distance threshold value (e.g. a length corresponding to an actual distance of 15 [m]) are included in pairs of two lines adjacent to each other in a preset second inter-line distance range (e.g. a length corresponding to an actual distance of 2.5 to 5 [m]) in lines extracted as candidates for parking frame lines.

At step S2040, a process is implemented in which, based on a result of the determination at step S2030, it is determined whether or not the own vehicle V is traveling in a non-parking area ("TRAVELING IN NON-PARKING AREA?" shown in the figure).

When it is determined at step S2040 that the own vehicle V is traveling in the non-parking area ("Yes" shown in the figure), the process implemented by the parking frame certainty setting unit 36 proceeds to step S2050.

On the other hand, when it is determined at step S2040 that the own vehicle V is not traveling in the non-parking area ("No" shown in the figure), the process implemented by the parking frame certainty setting unit 36 proceeds to step S2060.

Herein, a specific example of the process implemented at step S2040 will be described. When, for example, at least one of the following five conditions (B1 to B5) is satisfied, it is determined that the own vehicle V is traveling in a non-parking area (e.g. a public road or the like).

Condition B1: The vehicle speed of the own vehicle V is greater than or equal to 30 [km/h].

Condition B2: The continuous travel distance of the own vehicle V is greater than or equal to 100 [m].

Condition B3: A line having a length greater than or equal to the first line length distance threshold value is included in lines extracted as candidates for parking frame lines.

Condition B4: A pair of lines greater than or equal to the second line length distance threshold value are included in pairs of two lines in the first inter-line distance range in lines extracted as candidates for parking frame lines.

Condition B5: A pair of lines greater than or equal to the third line length distance threshold value are included in pairs of two lines in the second inter-line distance range in lines extracted as candidates for parking frame lines.

That is, when at least one of the above-described conditions B1 to B5 is satisfied, it is determined that the own vehicle V is traveling in a non-parking area other than a preset area for parking (e.g. a parking lot or the like).

At step S2050, a process is implemented to set an intersection detection flag to ON in accordance with the determination result at step S2040 that the own vehicle V is traveling in the non-parking area ("SET INTERSECTION DETECTION FLAG TO ON" shown in the figure). After the process of setting the intersection detection flag to ON is implemented at step S2050, the process finishes the series of processes and returns to the initial process.

Specifically, the value of the intersection detection flag is set to a value indicating ON (e.g. "1"). At step S2060, a process is implemented to set the intersection detection flag to OFF in accordance with the determination result at step S2040 that the own vehicle V is not traveling in the non-parking area ("SET INTERSECTION DETECTION FLAG TO OFF" shown in the figure). After the process of setting the intersection detection flag to OFF is implemented at step S2060, the process finishes the series of processes and returns to the initial process. Specifically, the value of the intersection detection flag is set to a value indicating OFF (e.g. "0").

Referring back to FIG. 7, at step S206, a process is implemented to extract, from the bird's-eye view image acquired at step S202, a determination element for use in setting a parking frame certainty ("DETERMINATION ELEMENT EXTRACTION PROCESS" shown in the figure). After the process of extracting the determination element from the bird's-eye view image is implemented at step S206, the process implemented by the parking frame certainty setting unit 36 proceeds to step S208.

Herein, the determination element is a line (white line or the like) marked on a road surface, such as a parking frame line, and, when a state of the line satisfies, for example, all of the following three conditions (C1 to C3), the line is extracted as a determination element (hereinafter may be referred to as a "parking frame line candidate").

Condition C1: When a line marked on a road surface has a broken portion, the broken portion is a blurred portion of the marked line (e.g. a portion whose clearness is lower than the line and higher than the road surface).

Condition C2: The width of a line marked on a road surface is greater than or equal to a preset width (e.g. 10 [cm]).

Condition C3: The length of a line marked on a road surface is greater than or equal to a preset marking line length (e.g. 2.5 [m]).

At step S208, a process is implemented in which, based on the result of the implementation of the intersection detection process at step S204, it is determined whether or not the intersection detection flag is ON ("INTERSECTION DETECTION FLAG ON?" shown in the figure). When it is determined at step S208 that the intersection detection flag is ON ("Yes" shown in the figure), the process implemented by the parking frame certainty setting unit 36 proceeds to step S210.

On the other hand, when it is determined at step S208 that the intersection detection flag is OFF ("No" shown in the figure), the process implemented by the parking frame certainty setting unit 36 proceeds to step S216.

At step S210, a process is implemented to set a suppression flag for use in determining whether or not to implement a process of suppressing an acceleration suppression control ("SUPPRESSION FLAG SETTING PROCESS" shown in the figure). After the process of setting the suppression flag is implemented at step S210, the process implemented by the parking frame certainty setting unit 36 proceeds to step S212.

Herein, using FIG. 9, a specific example of the process implemented at step S210 will be described. FIG. 9 is a flowchart showing a process of setting a suppression flag, implemented by the parking frame certainty setting unit 36.

Figure 9:
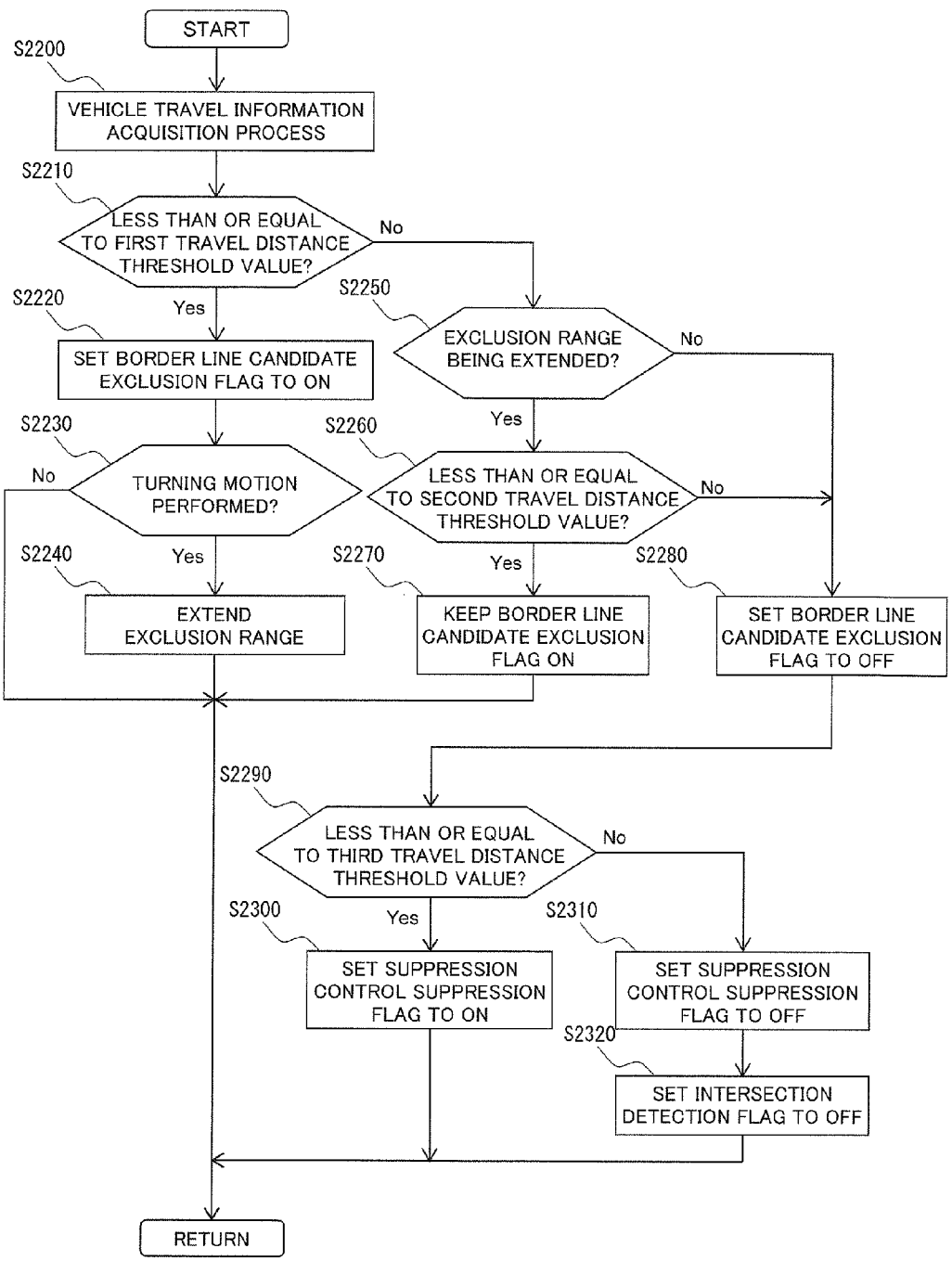
FIG. 9 is a flowchart showing a process of setting a suppression flag, implemented by the parking frame certainty setting unit 36.

When the parking frame certainty setting unit 36 starts (START) a process at step S210, first, as shown in FIG. 9, a process is implemented at step S2200 to acquire information for use in detecting a travel distance of the own vehicle V after detecting an intersection and information for use in detecting a turning motion of the own vehicle V ("VEHICLE TRAVEL INFORMATION ACQUISITION PROCESS" shown in the figure). After the process of acquiring the information for use in detecting the travel distance of the own vehicle V after detecting the intersection and the information for use in detecting the turning motion of the own vehicle V is implemented at step S2200, the process implemented by the parking frame certainty setting unit 36 proceeds to step S2210.

Specifically, at step S2200, a vehicle speed of the own vehicle V is acquired by referring to a vehicle speed computed value signal input from the own vehicle speed computing unit 10B. Then, information about a travel distance of the own vehicle V is acquired by integrating the acquired vehicle speed. Further, a rotation angle (steering angle) of the steering wheel 28 is acquired by referring to a steering angle signal input from the steering angle computing unit 10C.

At step S2210, a process is implemented to determine whether or not the travel distance of the own vehicle V acquired at step S2200 is less than or equal to a preset first travel distance threshold value (e.g. 20 [m]) ("LESS THAN OR EQUAL TO FIRST TRAVEL DISTANCE THRESHOLD VALUE?" shown in the figure).

When it is determined at step S2210 that the travel distance of the own vehicle V is less than or equal to the first travel distance threshold value ("Yes" shown in the figure), the process implemented by the parking frame certainty setting unit 36 proceeds to step S2220.

On the other hand, when is determined at step S2210 that the travel distance of the own vehicle V is not less than or equal to the first travel distance threshold value ("No" shown in the figure), the process implemented by the parking frame certainty setting unit 36 proceeds to step S2250.

At step S2220, a process is implemented to set to ON a frame line candidate exclusion flag for use in determining whether or not to exclude, from parking frame line candidacy, the line extracted as a parking frame line candidate at step S206 ("SET FRAME LINE CANDIDATE EXCLUSION FLAG TO ON" shown in the figure). After the process of setting the frame line candidate exclusion flag to ON is implemented at step S2220, the process implemented by the parking frame certainty setting unit 36 proceeds to step S2230.

At step S2230, a process is implemented in which, based on the steering angle of the own vehicle V acquired at step S2200, it is determined whether or not the own vehicle V has performed a turning motion ("TURNING MOTION PERFORMED?" shown in the figure). When it is determined at step S2230 that the own vehicle V has performed the turning motion ("Yes" shown in the figure), the process implemented by the parking frame certainty setting unit 36 proceeds to step S2240.

On the other hand, when it is determined at step S2230 that the own vehicle V has not performed the turning motion ("No" shown in the figure), the process implemented by the parking frame certainty setting unit 36 finishes the series of processes and returns to the initial process.

At step S2240, a process is implemented to extend the travel distance range that excludes, from parking frame line candidacy, the line extracted as a parking frame line candidate at step S206 ("EXTEND EXCLUSION RANGE" shown in the figure). Specifically, a preset second travel distance threshold value (e.g. 30 [m]) greater than the first travel distance threshold value is set as a travel distance threshold value for use in determining the frame line candidate exclusion flag. After the process of extending the travel distance range is implemented at step S2240, the process implemented by the parking frame certainty setting unit 36 finishes the series of processes and returns to the initial process.

At step S2250, a process is implemented to determine whether or not the travel distance range that excludes, from parking frame line candidacy, the line extracted as a parking frame line candidate at step S206 is being extended ("EXCLUSION RANGE BEING EXTENDED?" shown in the figure). When it is determined at step S2250 that the exclusion range is being extended, the process implemented by the parking frame certainty setting unit 36 proceeds to step S2260.

On the other hand, when it is determined at step S2250 that the exclusion range is not being extended, the process implemented by the parking frame certainty setting unit 36 proceeds to step S2280.

At step S2260, a process is implemented to determine whether or not the travel distance of the own vehicle V from the time point of detecting the intersection is less than or equal to the second travel distance threshold value ("LESS THAN OR EQUAL TO SECOND TRAVEL DISTANCE THRESHOLD VALUE?" shown in the figure). When it is determined at step S2260 that the travel distance of the own vehicle V is less than or equal to the second travel distance threshold value, the process implemented by the parking frame certainty setting unit 36 proceeds to step S2270.

On the other hand, when it is determined at step S2260 that the travel distance of the own vehicle V is not less than or equal to the second travel distance threshold value, the process implemented by the parking frame certainty setting unit 36 proceeds to step S2280.

At step S2270, a process is implemented to keep the frame line candidate exclusion flag ON ("KEEP FRAME LINE CANDIDATE EXCLUSION FLAG ON" shown in the figure). After the process of keeping the frame line candidate exclusion flag ON is implemented at step S2270, the process implemented by the parking frame certainty setting unit 36 finishes the series of processes and returns to the initial process.

At step S2280, a process is implemented to set the frame line candidate exclusion flag to OFF ("SET FRAME LINE CANDIDATE EXCLUSION FLAG TO OFF" shown in the figure). After the process of setting the frame line candidate exclusion flag to OFF is implemented at step S2280, the process implemented by the parking frame certainty setting unit 36 proceeds to step S2290.

At step S2290, a process is implemented to determine whether or not the travel distance of the own vehicle V from the time point of detecting the intersection is less than or equal to a preset third travel distance threshold value (e.g. 40 [m]) greater than the second travel distance threshold value ("LESS THAN OR EQUAL TO THIRD TRAVEL DISTANCE THRESHOLD VALUE?" shown in the figure). When it is determined at step S2290 that it is less than or equal to the third travel distance threshold value, the process implemented by the parking frame certainty setting unit 36 proceeds to step S2300.

On the other hand, when it is determined at step S2290 that it is not less than or equal to the third travel distance threshold value, the process implemented by the parking frame certainty setting unit 36 proceeds to step S2310.

At step S2300, a process is implemented to set to ON a suppression control suppression flag for use in determining whether or not to suppress an acceleration suppression control ("SET SUPPRESSION CONTROL SUPPRESSION FLAG TO ON" shown in the figure). After the process of setting the suppression control suppression flag to ON is implemented at step S2300, the process implemented by the parking frame certainty setting unit 36 finishes the series of processes and returns to the initial process.

At step S2310, a process is implemented to set the suppression control suppression flag to OFF ("SET SUPPRESSION CONTROL SUPPRESSION FLAG TO OFF" shown in the figure). After the process of setting the suppression control suppression flag to OFF is implemented at step S2310, the process implemented by the parking frame certainty setting unit 36 proceeds to step S2320.

At step S2320, a process is implemented to set the intersection detection flag to OFF ("SET INTERSECTION DETECTION FLAG TO OFF" shown in the figure). After the process of setting the intersection detection flag to OFF is implemented at step S2320, the process implemented by the parking frame certainty setting unit 36 finishes the series of processes and returns to the initial process.

Referring back to FIG. 7, at step S212, a process is implemented to determine whether or not the frame line candidate exclusion flag is ON ("FRAME LINE CANDIDATE EXCLUSION FLAG ON?" shown in the figure). When it is determined at step S212 that the frame line candidate exclusion flag is ON, the process implemented by the parking frame certainty setting unit 36 proceeds to step S214.

On the other hand, when it is determined at step S212 that the frame line candidate exclusion flag is OFF, the process implemented by the parking frame certainty setting unit 36 proceeds to step S216.

At step S214, a process is implemented to exclude, from parking frame line candidacy, the line extracted as a parking frame line candidate at step S206 ("FRAME LINE CANDIDATE EXCLUSION PROCESS" shown in the figure). Specifically, information of the line extracted as a parking frame line candidate is deleted from a memory. After the process of excluding, from parking frame line candidacy, the line extracted as a parking frame line candidate is implemented at step S214, the process implemented by the parking frame certainty setting unit 36 proceeds to step S216.

At step S216, a process is implemented to determine whether or not the parking frame line candidate extracted at step S206 is matched with the conditions of a line forming a parking frame ("PARKING FRAME CONDITIONS MATCHED?" shown in the figure).

When it is determined at step S216 that the parking frame line candidate extracted at step S206 is not matched with the conditions of a line forming a parking frame ("No" shown in the figure), the process implemented by the parking frame certainty setting unit 36 proceeds to step S202.

On the other hand, when it is determined at step S216 that the parking frame line candidate extracted at step S206 is matched with the conditions of a line forming a parking frame ("Yes" shown in the figure), the process implemented by the parking frame certainty setting unit 36 proceeds to step S218. The process at step S216 is implemented, for example, by referring to a bird's-eye view image signal input from the surrounding environment recognition information computing unit 10A.

Herein, using FIG. 10, a specific example of the process implemented at step S216 will be described. FIG. 10 is a diagram showing the content of the process implemented by the parking frame certainty setting unit 36. In FIG. 10, an area showing an image captured by the front camera 14F in a bird's-eye view image is denoted by symbol "PE".

At step S216, first, from lines marked on a road surface, which are parking frame line candidates extracted at step S206, the adjacent two lines displayed on the same image are specified as one pair (hereinafter may be referred to as "paired"). When three or more lines are displayed on the same image, two or more pairs are each specified by the adjacent two lines of the three or more lines.

Then, when the paired two lines satisfy, for example, all of the following four conditions (D1 to D4), it is determined that the parking frame line candidates extracted at step S206 are matched with the conditions of a line forming a parking frame.

Figure 10A:
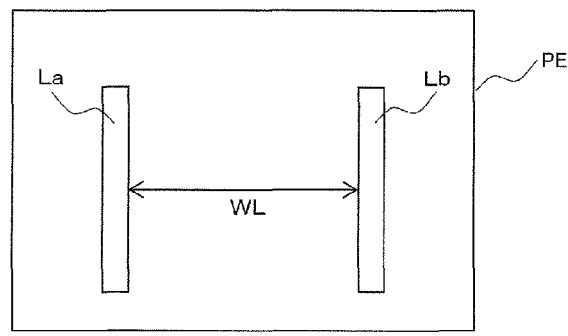
FIG. 10 is a diagram showing the content of a process implemented by the parking frame certainty setting unit.

Condition D1: As shown in FIG. 10A, a width WL between paired two lines (denoted by symbol "La" and symbol "Lb" in the figure) is less than or equal to a preset pairing width (e.g. 2.5 [m]).

Figure 10B:
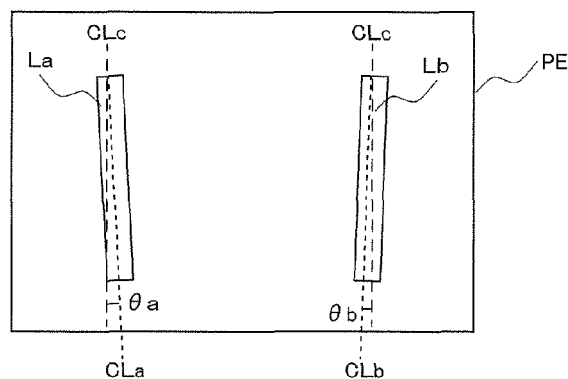

Condition D2: As shown in FIG. 10B, an angle (parallelism) formed between a line La and a line Lb is within a preset angle (e.g. 3[°]).

In FIG. 10(b), a reference line (a line extending in a perpendicular direction of the area PE) is indicated by a dotted line with symbol "CLc", a center axis of the line La is indicated by a broken line with symbol "CLa", and a center axis of the line Lb is indicated by a broken line with symbol "CLb". An inclination angle of the center axis CLa with respect to the reference line CLc is denoted by symbol "θa" and an inclination angle of the center axis CLb with respect to the reference line CLc is denoted by symbol "θb". Therefore, when a conditional expression of $|θa-θb|≤3[°]$ is established, the condition D2 is satisfied.

Figure 10C:
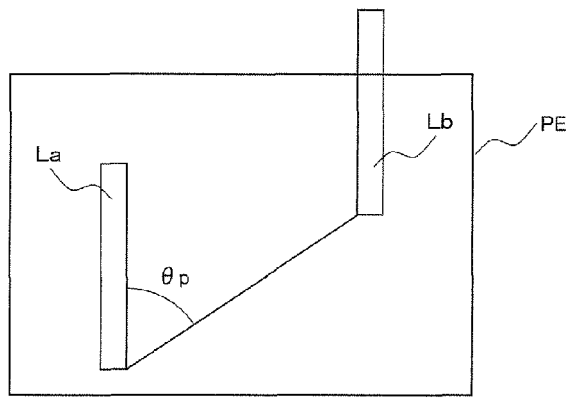

Condition D3: As shown in FIG. 10C, an angle θ formed between a straight line, connecting an end on the own vehicle V side (an end on the lower side in the figure) of a line La and an end on the own vehicle V side of a line Lb, and the line L on the side near the own vehicle V is greater than or equal to a preset offset angle (e.g. 45[°]).

Figure 10D:
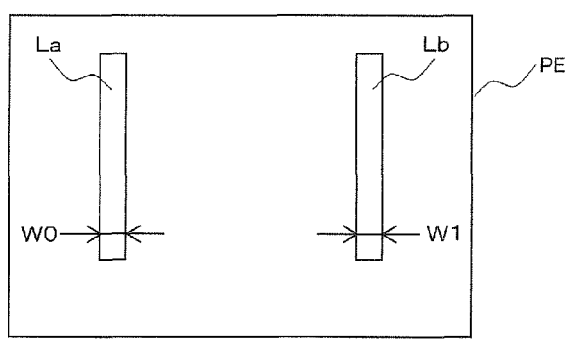

Condition D4: As shown in FIG. 10D, an absolute value ($|W0-W1|$) of a difference between a width W0 of a line La and a width W1 of a line Lb is less than or equal to a preset line width (e.g. 10 [cm]).

In the process of determining whether or not the above-described four conditions (D1 to D4) are satisfied, when at least one of the lines La and Lb is finished with a length of about 2 [m], the process is continued assuming that the line has a length of about 4 [m] with a virtual extended line of about 2 [m].

At step S218, a process is implemented to set the level of the parking frame certainty to a level (level 1) one step higher than the minimum value (level 0) ("SET TO LEVEL 1" shown in the figure). After the process of setting the parking frame certainty to the level 1 is implemented at step S218, the process implemented by the parking frame certainty setting unit 36 proceeds to step S220.

At step S220, a process is implemented to determine whether or not the process of step S216 continuously verifies until the movement distance of the own vehicle V reaches a preset movement distance from the start of the process of step S216 ("CONTINUOUS VERIFICATION MATCHED?" shown in the figure). Depending on various elements of the own vehicle V and a state of forward or backward movement of the own vehicle V, the preset movement distance is set in a range of, for example, 1 to 2.5 [m]. The process at step S220 is implemented, for example, by referring to a bird's-eye view image signal input from the surrounding environment recognition information computing unit 10A and a vehicle speed computed value signal input from the own vehicle speed computing unit 10B.

When it is determined at step S220 that the process of step S216 is not continuously verifying ("No" shown in the figure), the process implemented by the parking frame certainty setting unit 36 proceeds to step S202.

On the other hand, when it is determined at step S220 that the process of step S216 is continuously verifying ("Yes" shown in the figure), the process implemented by the parking frame certainty setting unit 36 proceeds to step S222.

Figure 11:
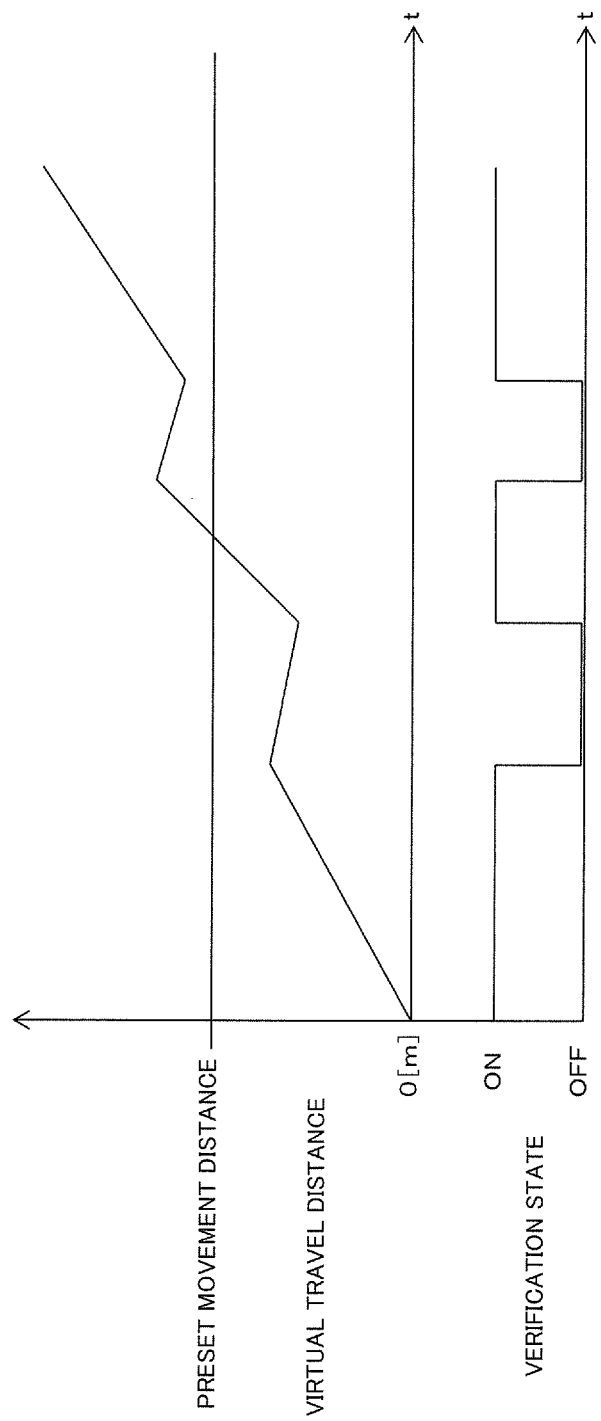
FIG. 11 is a diagram showing the content of a process implemented by the parking frame certainty setting unit.

Herein, in the process implemented at step S220, for example, as shown in FIG. 11, a movement distance of the own vehicle V is virtually computed depending on a state where the process of step S216 is verifying and a state where the process of step S216 is not verifying. FIG. 11 is a diagram showing the content of the process implemented by the parking frame certainty setting unit 36. In FIG. 11, in an area described as "VERIFICATION STATE", a state where the process of step S216 is verifying is indicated as "ON" and a state where the process of step S216 is not verifying is indicated as "OFF". Further, in FIG. 11, a virtually computed movement distance of the own vehicle V is indicated as "VIRTUAL TRAVEL DISTANCE".

As shown in FIG. 11, when the verification state of the process of step S216 is "ON", the virtual travel distance increases. On the other hand, when the verification state of the process of step S216 is "OFF", the virtual travel distance decreases.

In this embodiment, as one example, a description will be given of the case where an inclination (increase gain) when the virtual travel distance increases is set greater than an inclination (decrease gain) when the virtual travel distance decreases. That is, when the time is the same for the state where "VERIFICATION STATE" is "ON" and the state where "VERIFICATION STATE" is "OFF", the virtual travel distance increases.

Then, when the virtual travel distance reaches the preset movement distance without returning to an initial value (indicated as "0 [m]" in the figure), it is determined that the process of step S216 is continuously verifying.

At step S222, a process is implemented to set the level of the parking frame certainty to a level (level 2) two steps higher than the minimum value (level 0) ("SET TO LEVEL 2" shown in the figure). After the process of setting the parking frame certainty to the level 2 is implemented at step S222, the process implemented by the parking frame certainty setting unit 36 proceeds to step S224.

At step S224, for the lines La and Lb continuously verified by the process of step S216, endpoints located on the same side with respect to the own vehicle V (endpoints on the near side or endpoints on the far side) are detected. Then, a process is implemented to determine whether or not the endpoints located on the same side are opposite to each other in the width WL direction ("OPPOSITENESS OF FAR/NEAR ENDPOINTS MATCHED?" shown in the figure). The process at step S224 is implemented, for example, by referring to a bird's-eye view image signal input from the surrounding environment recognition information computing unit 10A and a vehicle speed computed value signal input from the own vehicle speed computing unit 10B.

When it is determined at step S224 that the endpoints located on the same side are not opposite to each other in the width WL direction ("No" shown in the figure), the process implemented by the parking frame certainty setting unit 36 proceeds to step S202.

On the other hand, when it is determined at step S224 that the endpoints located on the same side are opposite to each other in the width WL direction ("Yes" shown in the figure), the process implemented by the parking frame certainty setting unit 36 proceeds to step S226.

At step S226, a process is implemented to set the level of the parking frame certainty to a level (level 3) three steps higher than the minimum value (level 0) ("SET TO LEVEL 3" shown in the figure). After the process of setting the parking frame certainty to the level 3 is implemented at step S226, the process implemented by the parking frame certainty setting unit 36 proceeds to step S228.

At step S228, for the lines La and Lb whose endpoints located on the same side are determined to be opposite to each other in the width WL direction in the process of step S224, endpoints located on the other side are further detected. That is, when the endpoints on the near side (one side) are detected for the lines La and Lb in the process of step S224, the endpoints on the far side (the other side) are detected for the lines La and Lb at step S228. Then, a process is implemented to determine whether or not the endpoints located on the other side are opposite to each other in the width WL direction ("OPPOSITENESS OF BOTH-END ENDPOINTS MATCHED?" shown in the figure). The process at step S228 is implemented, for example, by referring to a bird's-eye view image signal input from the surrounding environment recognition information computing unit 10A and a vehicle speed computed value signal input from the own vehicle speed computing unit 10B.

When detecting the endpoint of the line La, Lb, for example, an endpoint of a straight line like an endpoint of a line shown in FIG. 4(a), a U-shaped endpoint like an upper endpoint of a line shown in FIG. 4(g), and a point of intersection between a double line and a transverse line shown in FIG. 4(o) are each processed as an endpoint of a single straight line. Likewise, an endpoint of a double line like an upper endpoint of a line shown in FIG. 4(h) and an endpoint in the form of a U-shaped curved line with an opening like an upper endpoint of a line shown in FIG. 4(m) are each also processed as an endpoint of a single line.

Further, when detecting the endpoint of the line La, Lb, for example, a point of intersection between an inclined double line extending in an up-down direction and a single straight line extending in a left-right direction shown in FIG. 4(n) is not processed (recognized) as an endpoint. This is because when detecting an endpoint, an endpoint is detected by scanning in a lateral direction in an area showing a captured image. Further, for example, since an area indicated by a white border rectangle in FIG. 4(p) indicates a road object such as a pole, an endpoint of this object is also not detected.

When it is determined at step S228 that the endpoints located on the other side are not opposite to each other in the width WL direction ("No" shown in the figure), the process implemented by the parking frame certainty setting unit 36 proceeds to step S202.

On the other hand, when it is determined at step S228 that the endpoints located on the other side are opposite to each other in the width WL direction ("Yes" shown in the figure), the process implemented by the parking frame certainty setting unit 36 proceeds to step S230.

At step S230, a process is implemented to set the level of the parking frame certainty to a level (level 4) four steps higher than the minimum value (level 0) ("SET TO LEVEL 4" shown in the figure). After the process of setting the parking frame certainty to the level 4 is implemented at step S230, the process implemented by the parking frame certainty setting unit 36 proceeds to step S232.

Therefore, in the process of setting the parking frame certainty to the level 3, the parking frame certainty is set for the patterns of (d), (e), (j), and (k) among the parking frames shown in FIG. 4. In the process of setting the parking frame certainty to the level 4, the parking frame certainty is set for the patterns excluding (d), (e), (j), and (k) among the parking frames shown in FIG. 4.

At step S232, a process is implemented to determine whether or not a preset end condition for the process implemented by the parking frame certainty setting unit 36 is established ("END CONDITION ESTABLISHED?" shown in the figure).

Specifically, for example, it is determined whether or not an end condition is satisfied, based on whether or not the shift position is at parking ("P") detected based on a shift position signal input from the shift position sensor 20, based on detection of ignition ON to OFF, or the like. When it is determined at step S232 that the end condition is satisfied, the process implemented by the parking frame certainty setting unit 36 ends (END).

On the other than, when it is determined at step S232 that the end condition is not satisfied, the process implemented by the parking frame certainty setting unit 36 proceeds to step S202.

The above-described series of processes implemented by the parking frame certainty setting unit 36 are repeatedly implemented every time the start condition is established.

Figure 12:
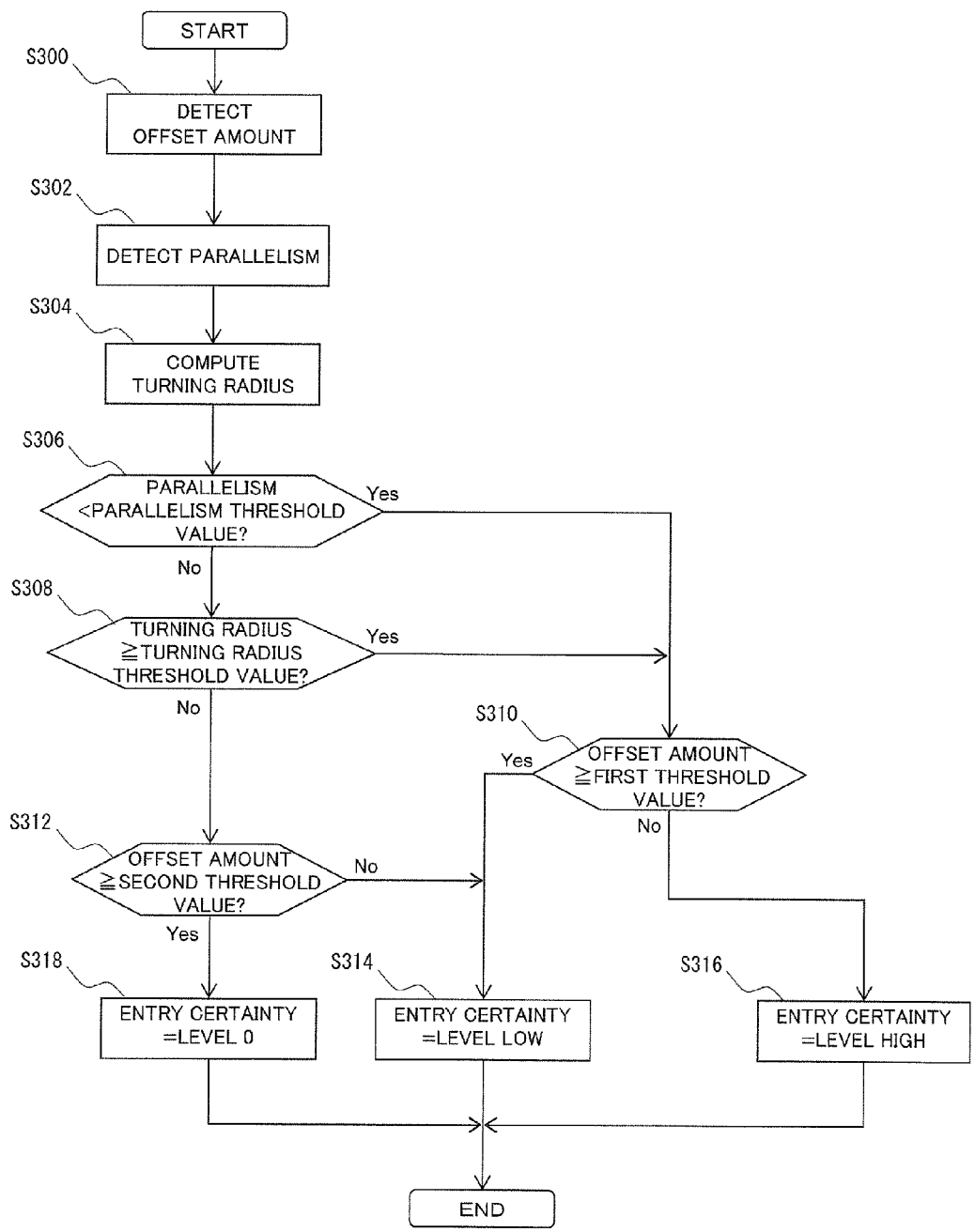
FIG. 12 is a flowchart showing a process of setting a parking frame entry certainty, implemented by a parking frame entry certainty setting unit.

Using FIGS. 12 and 13 while referring to FIGS. 1 to 11, a process of setting a parking frame entry certainty, implemented by the parking frame entry certainty setting unit 38, will be described. FIG. 12 is a flowchart showing a process of setting a parking frame entry certainty, implemented by the parking frame entry certainty setting unit 38. The parking frame entry certainty setting unit 38 implements the following process per preset sampling time (e.g. 10 [msec]).

As shown in FIG. 12, when the parking frame entry certainty setting unit 38 starts (START) a process, first, a process is implemented at step S300 to detect an offset amount between a predicted track of the own vehicle V and a parking frame ("DETECT OFFSET AMOUNT" shown in the figure). After the process of detecting the offset amount between the predicted track of the own vehicle V and the parking frame is implemented at step S300, the process implemented by the parking frame entry certainty setting unit 38 proceeds to step S302. In this embodiment, as one example, a description will be given of the case where the unit of an offset amount detected at step S300 is set to [cm]. Further, in this embodiment, as one example, a description will be given of the case where the width of a parking frame is set to 2.5 [m].

Figure 13:
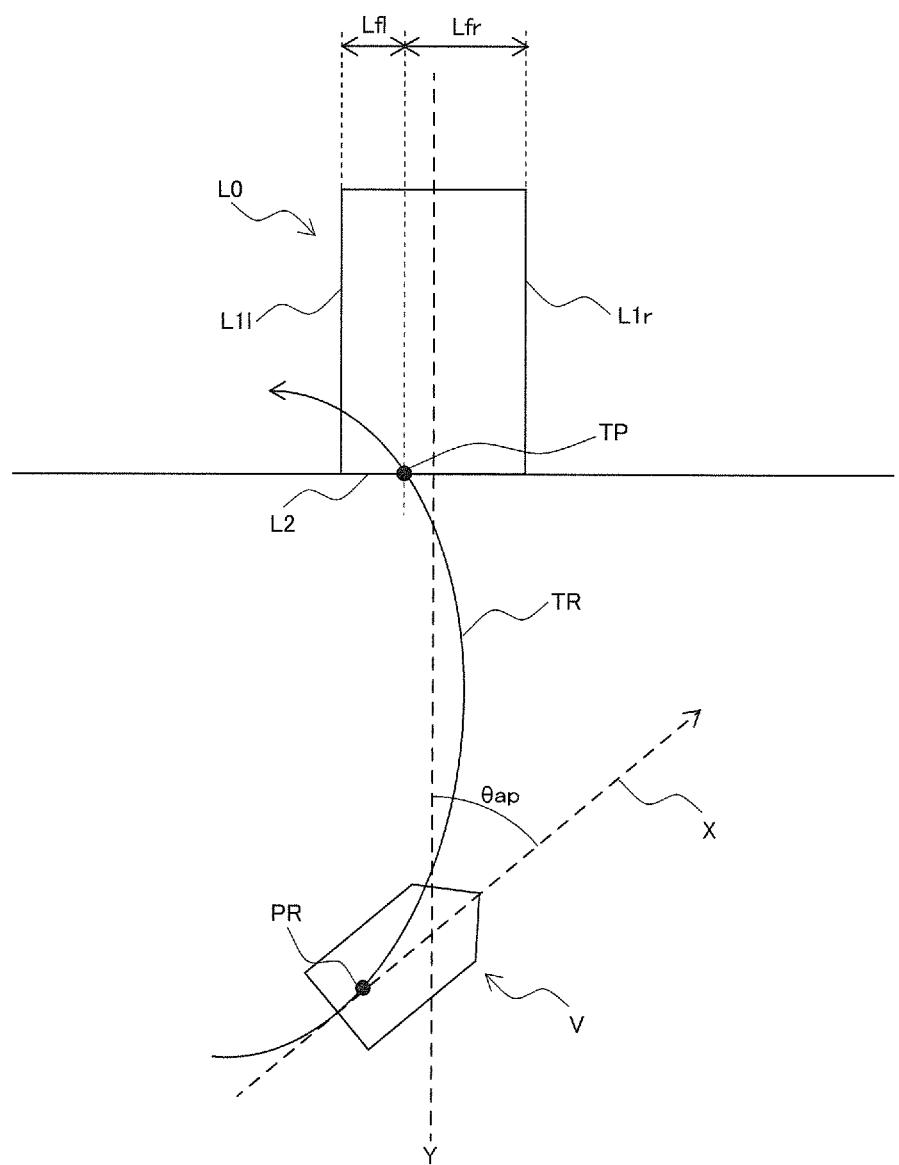
FIG. 13 is a diagram showing the content of a process of detecting an offset amount between a predicted track of an own vehicle and a parking frame.

Herein, in the process implemented at step S300, for example, as shown in FIG. 13, a rear wheel predicted track TR of the own vehicle V is computed and then an intersecting point TP between the computed rear wheel predicted track TR and an entrance L2 of a parking frame L0 is computed. Further, a distance Lfl between a left frame line L1l of the parking frame L0 and the intersecting point TP, and a distance Lfr between a right frame line L1r of the parking frame L0 and the intersecting point TP are computed and then the distance Lfl and the distance Lfr are compared to each other. The distance Lfl or the distance Lfr, whichever is longer, is detected as an offset amount. FIG. 13 is a diagram showing the content of the process of detecting an offset amount between the rear wheel predicted track TR of the own vehicle V and the parking frame L0.

When computing a rear wheel predicted track TR of the own vehicle V, a center point PR in the vehicle width direction between the right rear wheel WRR and the left rear wheel WRL of the own vehicle V is set as a reference point of the own vehicle V. Then, using images captured by the front camera 14F and the left-side camera 14SL in a bird's-eye view image, a vehicle speed of the own vehicle V, and a rotation angle (steering angle) of the steering wheel 28, a virtual movement path of the center point PR is computed, thereby computing a rear wheel predicted track TR.

At step S302, for example, using an image captured by the front camera 14F in a bird's-eye view image, a process is implemented to detect a parallelism between a straight line X and a longitudinal direction (e.g. a depth direction) of the parking frame L0 ("DETECT PARALLELISM" shown in the figure). After the process of detecting the parallelism between the straight line X and the longitudinal direction of the parking frame L0 is implemented at step S302, the process implemented by the parking frame entry certainty setting unit 38 proceeds to step S304.

Herein, as shown in FIG. 13, the parallelism detected at step S302 is detected as an angle θap formed between a center line Y of the parking frame L0 and the straight line X. At step S302, when the own vehicle V moves to the parking frame L0 while moving backward, the process of detecting a parallelism between the straight line X and the longitudinal direction of the parking frame L0 is implemented, for example, by using an image captured by the rear camera 14R in a bird's-eye view image. Herein, the moving direction (forward, backward) of the own vehicle V is detected, for example, by referring to a current shift position signal.

At step S304, using a vehicle speed of the own vehicle V and a rotation angle (steering angle) of the steering wheel 28, a process is implemented to compute a turning radius of the own vehicle V ("COMPUTE TURNING RADIUS" shown in the figure). After the process of computing the turning radius of the own vehicle V is implemented at step S304, the process implemented by the parking frame entry certainty setting unit 38 proceeds to step S306.

At step S306, a process is implemented to determine whether or not the parallelism (θap) detected at step S302 is less than a preset parallelism threshold value (e.g. 15[°]) ("PARALLELISM<PARALLELISM THRESHOLD VALUE?" shown in the figure).

When it is determined at step S306 that the parallelism (θap) detected at step S302 is greater than or equal to the parallelism threshold value ("No" shown in the figure), the process implemented by the parking frame entry certainty setting unit 38 proceeds to step S308.

On the other hand, when it is determined at step S306 that the parallelism (θap) detected at step S302 is less than the parallelism threshold value ("Yes" shown in the figure), the process implemented by the parking frame entry certainty setting unit 38 proceeds to step S310.

At step S308, a process is implemented to determine whether or not the turning radius detected at step S304 is greater than or equal to a preset turning radius threshold value (e.g. 100 [R]) ("TURNING RADIUS≥TURNING RADIUS THRESHOLD VALUE?" shown in the figure).

When it is determined at step S308 that the turning radius detected at step S304 is less than the turning radius threshold value ("No" shown in the figure), the process implemented by the parking frame entry certainty setting unit 38 proceeds to step S312.

On the other hand, when it is determined at step S308 that the turning radius detected at step S304 is greater than or equal to the turning radius threshold value ("Yes" shown in the figure), the process implemented by the parking frame entry certainty setting unit 38 proceeds to step S310.

At step S310, a process is implemented to determine whether or not the offset amount detected at step S300 is greater than or equal to a preset first threshold value (e.g. 75 [cm]) ("OFFSET AMOUNT≥FIRST THRESHOLD VALUE?" shown in the figure).

When it is determined at step S310 that the offset amount detected at step S300 is greater than or equal to the first threshold value ("Yes" shown in the figure), the process implemented by the parking frame entry certainty setting unit 38 proceeds to step S314.

On the other hand, when it is determined at step S310 that the offset amount detected at step S300 is less than the first threshold value ("No" shown in the figure), the process implemented by the parking frame entry certainty setting unit 38 proceeds to step S316.

At step S312, a process is implemented to determine whether or not the offset amount detected at step S300 is greater than or equal to a preset second threshold value (e.g. 150 [cm]) ("OFFSET AMOUNT≥SECOND THRESHOLD VALUE?" shown in the figure). Herein, the second threshold value is set to a value greater than the first threshold value.

When it is determined at step S312 that the offset amount detected at step S300 is greater than or equal to the second threshold value ("Yes" shown in the figure), the process implemented by the parking frame entry certainty setting unit 38 proceeds to step S318.

On the other hand, when it is determined at step S312 that the offset amount detected at step S300 is less than the second threshold value ("No" shown in the figure), the process implemented by the parking frame entry certainty setting unit 38 proceeds to step S314.

At step S314, a process is implemented to set the parking frame entry certainty to a low level ("ENTRY CERTAINTY=LEVEL LOW" shown in the figure). After the process of setting the parking frame entry certainty to the low level is implemented at step S314, the process implemented by the parking frame entry certainty setting unit 38 ends (END).

At step S316, a process is implemented to set the parking frame entry certainty to a high level ("ENTRY CERTAINTY=LEVEL HIGH" shown in the figure). After the process of setting the parking frame entry certainty to the high level is implemented at step S316, the process implemented by the parking frame entry certainty setting unit 38 ends (END).

At step S318, a process is implemented to set the parking frame entry certainty to a minimum value (level 0) ("ENTRY CERTAINTY=LEVEL 0" shown in the figure). After the process of setting the parking frame entry certainty to the level 0 is implemented at step S318, the process implemented by the parking frame entry certainty setting unit 38 ends (END).

As described above, the parking frame entry certainty setting unit 38 implements a process of setting the parking frame entry certainty to one of "level 0" as the minimum value, "level low" higher than the level 0, and "level high" higher than the level low.

Using FIG. 14 while referring to FIGS. 1 to 13, a process of setting a total certainty, implemented by the total certainty setting unit 40, will be described.

The total certainty setting unit 40 receives input of a parking frame certainty signal and a parking frame entry certainty signal and matches a parking frame certainty included in the parking frame certainty signal and a parking frame entry certainty included in the parking frame entry certainty signal to a total certainty setting map shown in FIG. 14. Then, a total certainty is set based on the parking frame certainty and the parking frame entry certainty.

FIG. 14 is a diagram showing the total certainty setting map. In FIG. 14, the parking frame certainty is indicated as "BORDER CERTAINTY" and the parking frame entry certainty is indicated as "ENTRY CERTAINTY". The total certainty setting map shown in FIG. 14 is a map for use during forward travel of the own vehicle V.

As one example of a process of setting a total certainty implemented by the total certainty setting unit 40, as shown in FIG. 14, when the parking frame certainty is "LEVEL 3" and the parking frame entry certainty is "LEVEL HIGH", the total certainty is set to "HIGH".

In this embodiment, as one example, a description will be given of the case where when the total certainty setting unit 40 has implemented a process of setting a total certainty, a process is implemented to store the set total certainty in a storage unit configured not to delete data even if an ignition switch is turned off. Herein, the storage unit configured not to delete data even if the ignition switch is turned off is, for example, a nonvolatile memory such as a flash memory.

Therefore, in this embodiment, even if the ignition switch is turned off after parking the own vehicle V, when the ignition switch is turned on at the time of restarting the own vehicle V, the total certainty set last is stored. Accordingly, the control based on the last set total certainty can be started from the time point when the ignition switch is turned on at the time of restarting the own vehicle V.

Using FIG. 15 while referring to FIGS. 1 to 14, a process of computing an acceleration suppression control start timing, implemented by the acceleration suppression control start timing computing unit 42, will be described. The acceleration suppression control start timing computing unit 42 receives input of a total certainty signal and matches a total certainty included in the total certainty signal to an acceleration suppression condition computing map shown in FIG. 15. Then, an acceleration suppression control start timing is computed based on the total certainty.

FIG. 15 is a diagram showing the acceleration suppression condition computing map. In FIG. 15, the acceleration suppression control start timing is indicated as "SUPPRESSION CONTROL START TIMING (ACCELERATOR OPENING DEGREE)" in a column of "ACCELERATION SUPPRESSION CONDITION".

As one example of a process implemented by the acceleration suppression control start timing computing unit 42, as shown in FIG. 15, when the total certainty is "HIGH", the acceleration suppression control start timing is set to a timing at which the opening degree of the accelerator pedal 32 increases to reach "50%". The opening degree of the accelerator pedal 32 is set assuming that a state of the accelerator pedal 32 depressed (operated) to a maximum value is 100%.

Referring to FIGS. 1 to 15, a process of computing an acceleration suppression control amount, implemented by the acceleration suppression control amount computing unit 44, will be described.

The acceleration suppression control amount computing unit 44 receives input of a total certainty signal and matches a total certainty included in the total certainty signal to the acceleration suppression condition computing map shown in FIG. 15. Then, an acceleration suppression control amount is computed based on the total certainty. In FIG. 15, the acceleration suppression control amount is indicated as "SUPPRESSION AMOUNT" in a column of "ACCELERATION SUPPRESSION CONDITION".

As one example of a process implemented by the acceleration suppression control amount computing unit 44, as shown in FIG. 15l, when the total certainty is "HIGH", the acceleration suppression control amount is set to a control amount that reduces an actual opening degree of the accelerator pedal 32 to a "MIDDLE" level throttle opening degree. In this embodiment, as one example, the "MIDDLE" level throttle opening degree is set to an opening degree of 25% of an actual opening degree of the accelerator pedal 32. Likewise, a "SMALL" level throttle opening degree is set to an opening degree of 50% of an actual opening degree of the accelerator pedal 32 and a "LARGE" level throttle opening degree is set to an opening degree of 10% of an actual opening degree of the accelerator pedal 32.

Further, the acceleration suppression control amount computing unit 44 matches the total certainty to the acceleration suppression condition computing map and sets the presence or absence of a control to output an alarm sound. When outputting an alarm sound, for example, visual information such as character information with content that the acceleration suppression control is operated, a mark, or light emission may be displayed on the display monitor of the navigation device 26.

(Process Implemented by Acceleration Suppression Command Value Computing Unit 10J)

Figure 16:
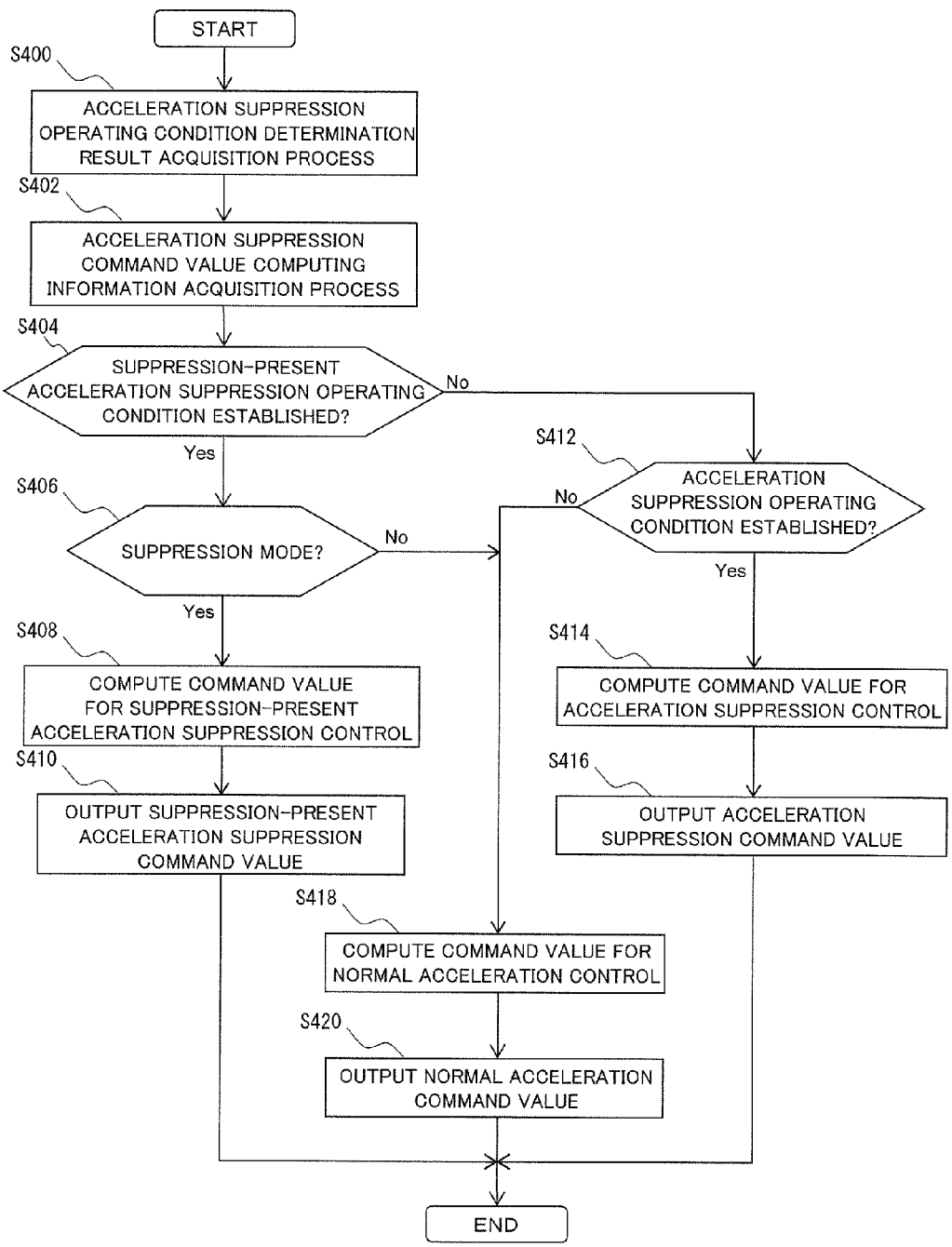
FIG. 16 is a flowchart showing a process implemented by an acceleration suppression command value computing unit.

Next, using FIG. 16 while referring to FIGS. 1 to 15, a process implemented by the acceleration suppression command value computing unit 10J will be described. FIG. 16 is a flowchart showing a process implemented by the acceleration suppression command value computing unit 10J. The acceleration suppression command value computing unit 10J implements the following process per preset sampling time (e.g. 10 [msec]).

As shown in FIG. 16, when the acceleration suppression command value computing unit 10J starts (START) a process, first, at step S400, it refers to an acceleration suppression operating condition determination result signal input from the acceleration suppression control content computing unit 10I. Then, a process is implemented to acquire an acceleration suppression operating condition determination result ("ACCELERATION SUPPRESSION OPERATING CONDITION DETERMINATION RESULT ACQUISITION PROCESS" shown in the figure). After the process of acquiring the acceleration suppression operating condition determination result is implemented at step S400, the process implemented by the acceleration suppression command value computing unit 10J proceeds to step S402.

At step S402, a process is implemented to acquire, in addition to the acceleration suppression operating condition determination result acquired at step S400, information for use in computing an acceleration suppression command value ("ACCELERATION SUPPRESSION COMMAND VALUE COMPUTING INFORMATION ACQUISITION PROCESS" shown in the figure). After the process of acquiring the information for use in computing the acceleration suppression command value is implemented at step S402, the process implemented by the acceleration suppression command value computing unit 10J proceeds to step S404.

The information for computing the acceleration suppression command value is, for example, information including the above-described acceleration suppression control start timing signal, acceleration suppression control amount signal, driving-side depression amount signal, accelerator operation speed signal, and suppression-present acceleration suppression control mode setting information.

At step S404, a process is implemented to determine whether or not the acceleration suppression operating condition determination result acquired at step S400 is a determination result that the suppression-present acceleration suppression control operating condition is established ("SUPPRESSION-PRESENT ACCELERATION SUPPRESSION OPERATING CONDITION ESTABLISHED?" shown in the figure).

When it is determined at step S404 that the determination result is that the suppression-present acceleration suppression control operating condition is established ("Yes" shown in the figure), the process implemented by the acceleration suppression command value computing unit 10J proceeds to step S406.

On the other hand, when it is determined at step S404 that the determination result is that the suppression-present acceleration suppression control operating condition is not established ("No" shown in the figure), the process implemented by the acceleration suppression command value computing unit 10J proceeds to step S412.

At step S406, a process is implemented in which, based on the information for computing the acceleration suppression command value acquired at step S402, it is determined whether or not the suppression mode is set ("SUPPRESSION MODE?" shown in the figure). When it is determined at step S406 that the suppression mode is set, the process implemented by the acceleration suppression command value computing unit 10J proceeds to step S408.

On the other hand, when it is determined at step S406 that the suppression mode is not set (the stopping mode is set), the process implemented by the acceleration suppression command value computing unit 10J proceeds to step S418.

At step S408, a process is implemented to compute, based on the information for computing the acceleration suppression command value acquired at step S402, a suppression-present acceleration suppression command value which is an acceleration command value for performing a suppression-present acceleration suppression control ("COMPUTE COMMAND VALUE FOR SUPPRESSION-PRESENT ACCELERATION SUPPRESSION CONTROL" shown in the figure). After the process of computing the suppression-present acceleration suppression command value is implemented at step S408, the process implemented by the acceleration suppression command value computing unit 10J proceeds to step S410.

Herein, in the process of computing the suppression-present acceleration suppression command value, the depression amount of the accelerator pedal 32 included in the driving-side depression amount signal and the acceleration suppression control amount included in the acceleration suppression control amount signal are referred to. Then, first, an acceleration suppression control amount command value that reduces an actual opening degree of the accelerator pedal 32 to a suppression degree corresponding to the acceleration suppression control amount (see FIG. 15) is computed. In addition, a process is implemented to suppress the computed acceleration suppression control amount command value. In this embodiment, the computed acceleration suppression control amount command value is multiplied by a preset suppression coefficient (e.g. a value smaller than 1, such as "0.7"). In this manner, a suppression-present acceleration suppression control amount command value is computed.

Further, in the process of computing the suppression-present acceleration suppression command value, the depression amount of the accelerator pedal 32 included in the driving-side depression amount signal and the acceleration suppression control start timing included in the acceleration suppression control start timing signal are referred to. Then, an acceleration suppression control start timing command value that matches the acceleration suppression control start timing to a timing corresponding to an actual opening degree of the accelerator pedal 32 (see FIG. 15) is computed. In this embodiment, in the suppression-present acceleration suppression control, the start timing of the suppression-present acceleration suppression control is the same as the start timing of the acceleration suppression control. Also for the start timing, it may be configured that the acceleration suppression control start timing command value is multiplied by a suppression coefficient (e.g. a value that delays the timing) to compute a suppression-present acceleration suppression control start timing value.

Then, in the process of computing the suppression-present acceleration suppression command value, a command value including the thus computed suppression-present acceleration suppression control amount command value and acceleration suppression control start timing command value is computed as a suppression-present acceleration suppression command value.

At step S410, a process is implemented to output a suppression-present acceleration suppression command value signal including the suppression-present acceleration suppression command value computed at step S408 to the target throttle opening degree computing unit 10K ("OUTPUT SUPPRESSION-PRESENT ACCELERATION SUPPRESSION COMMAND VALUE" shown in the figure). After the process of outputting the suppression-present acceleration suppression command value signal is implemented at step S410, the process implemented by the acceleration suppression command value computing unit 10J ends (END).

At step S412, a process is implemented to determine whether or not the acceleration suppression operating condition determination result acquired at step S400 is a determination result that the acceleration suppression control operating condition is established ("ACCELERATION SUPPRESSION OPERATING CONDITION ESTABLISHED?" shown in the figure).

When it is determined at step S412 that the determination result is that the acceleration suppression control operating condition is established ("Yes" shown in the figure), the process implemented by the acceleration suppression command value computing unit 10J proceeds to step S414.

On the other hand, when it is determined at step S412 that the determination result is that the acceleration suppression control operating condition is not established ("No" shown in the figure), the process implemented by the acceleration suppression command value computing unit 10J proceeds to step S418.

At step S414, a process is implemented to compute, based on the information for computing the acceleration suppression command value acquired at step S402, an acceleration suppression command value which is an acceleration command value for performing an acceleration suppression control ("COMPUTE COMMAND VALUE FOR ACCELERATION SUPPRESSION CONTROL" shown in the figure). After the process of computing the acceleration suppression command value is implemented at step S414, the process implemented by the acceleration suppression command value computing unit 10J proceeds to step S416.

Herein, in the process of computing the acceleration suppression command value, the depression amount of the accelerator pedal 32 included in the driving-side depression amount signal and the acceleration suppression control amount included in the acceleration suppression control amount signal are referred to. Then, an acceleration suppression control amount command value that reduces an actual opening degree of the accelerator pedal 32 to a suppression degree corresponding to the acceleration suppression control amount (see FIG. 15) is computed.

Further, in the process of computing the acceleration suppression command value, the depression amount of the accelerator pedal 32 included in the driving-side depression amount signal and the acceleration suppression control start timing included in the acceleration suppression control start timing signal are referred to. Then, an acceleration suppression control start timing command value that matches the acceleration suppression control start timing to a timing corresponding to an actual opening degree of the accelerator pedal 32 (see FIG. 15) is computed.

Then, in the process of computing the acceleration suppression command value, a command value including the thus computed acceleration suppression control amount command value and acceleration suppression control start timing command value is computed as an acceleration suppression command value.

At step S416, a process is implemented to output an acceleration suppression command value signal including the acceleration suppression command value computed at step S414 to the target throttle opening degree computing unit 10K ("OUTPUT ACCELERATION SUPPRESSION COMMAND VALUE" shown in the figure). After the process of outputting the acceleration suppression command value signal is implemented at step S416, the process implemented by the acceleration suppression command value computing unit 10J ends (END).

At step S418, a process is implemented to compute a normal acceleration command value as an acceleration command value for use in a driving force control with no acceleration suppression control, i.e. in a normal acceleration control ("COMPUTE COMMAND VALUE FOR NORMAL ACCELERATION CONTROL" shown in the figure). After the process of computing the normal acceleration command value is implemented at step S418, the process implemented by the acceleration suppression command value computing unit 10J proceeds to step S420.

Herein, in the process of computing the normal acceleration command value, a command value that computes a throttle opening degree based on the depression amount of the accelerator pedal 32 included in the driving-side depression amount signal is computed as a normal acceleration command value.

At step S420, a process is implemented to output a normal acceleration command value signal including the normal acceleration command value computed at step S418 to the target throttle opening degree computing unit 10K ("OUTPUT NORMAL ACCELERATION COMMAND VALUE" shown in the figure). After the process of outputting the normal acceleration command value signal is implemented at step S420, the process implemented by the acceleration suppression command value computing unit 10J ends (END).

(Process Implemented by Target Throttle Opening Degree Computing Unit 10K)

Figure 17:
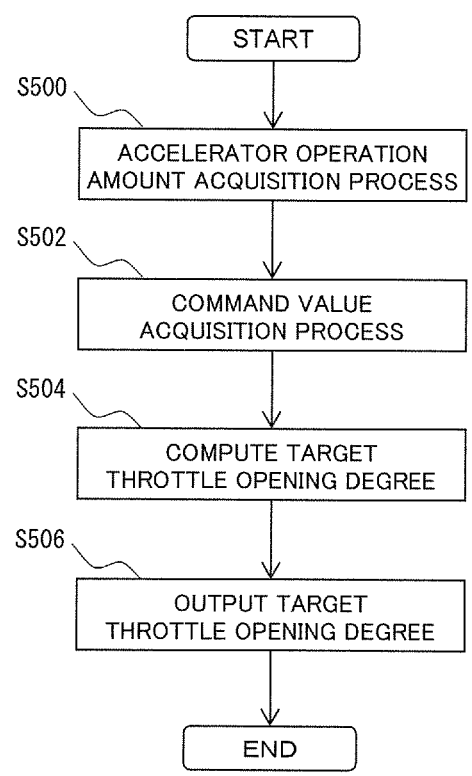
FIG. 17 is a flowchart showing a process implemented by a target throttle opening degree computing unit.

Next, using FIG. 17 while referring to FIGS. 1 to 16, a process implemented by the target throttle opening degree computing unit 10K will be described. FIG. 17 is a flowchart showing a process implemented by the target throttle opening degree computing unit 10K. The target throttle opening degree computing unit 10K implements the following process per preset sampling time (e.g. 10 [msec]).

As shown in FIG. 17, when the target throttle opening degree computing unit 10K starts (START) a process, first, at step S500, it refers to a driving-side depression amount signal input from the accelerator operation amount computing unit 10G. Then, a process is implemented to acquire a depression amount (acceleration operation amount) of the accelerator pedal 32 included in the driving-side depression amount signal ("ACCELERATOR OPERATION AMOUNT ACQUISITION PROCESS" shown in the figure). After the process of acquiring the depression amount (acceleration operation amount) of the accelerator pedal 32 is implemented at step S500, the process implemented by the target throttle opening degree computing unit 10K proceeds to step S502.

At step S502, a process is implemented to acquire, based on an information signal input from the acceleration suppression command value computing unit 10J, a suppression-present acceleration suppression command value (see step S408), an acceleration suppression command value (see step S414), or a normal acceleration command value (see step S418) ("COMMAND VALUE ACQUISITION PROCESS" shown in the figure). After the process of acquiring the suppression-present acceleration suppression command value, the acceleration suppression command value, or the normal acceleration command value is implemented at step S502, the process implemented by the target throttle opening degree computing unit 10K proceeds to step S504.

At step S504, a target throttle opening degree is computed based on the depression amount of the accelerator pedal 32 acquired at step S500 and the command value acquired at step S502 ("COMPUTE TARGET THROTTLE OPENING DEGREE" shown in the figure). After the target throttle opening degree is computed at step S504, the process implemented by the target throttle opening degree computing unit 10K proceeds to step S506.

Herein, at step S504, when the command value acquired at step S502 is the normal acceleration command value (when the acceleration suppression operating condition is not established), a throttle opening degree corresponding to the depression amount of the accelerator pedal 32 is computed as a target throttle opening degree.

On the other hand, when the command value acquired at step S502 is the suppression-present acceleration suppression command value (when the suppression-present acceleration suppression operating condition is established), a throttle opening degree corresponding to the suppression-present acceleration suppression command value is computed as a target throttle opening degree.

Alternatively, when the command value acquired at step S502 is the acceleration suppression command value (when the acceleration suppression operating condition is established), a throttle opening degree corresponding to the acceleration suppression control amount command value is computed as a target throttle opening degree.

A target throttle opening degree is computed, for example, by using the following formula (1).

$$\theta^* = \theta_1 - \theta \quad (1)$$

In the formula (1), a target throttle opening degree is given as "$\theta^*$", a throttle opening degree corresponding to a depression amount of the accelerator pedal 32 is given as "$\theta_1$", and an acceleration suppression control amount is given as "$\theta$".

At step S506, a target throttle opening degree signal including the target throttle opening degree $\theta^*$ computed at step S504 is output to the engine controller 12 ("OUTPUT TARGET THROTTLE OPENING DEGREE" shown in the figure). After the process of outputting the target throttle opening degree signal to the engine controller 12 is implemented at step S506, the process implemented by the target throttle opening degree computing unit 10K ends (END).

Herein, at step S506, when the command value acquired at step S502 is the suppression-present acceleration suppression command value or the acceleration suppression command value, the target throttle opening degree signal is output at a timing at which the opening degree (depression amount) of the accelerator pedal 32 has reached an opening degree corresponding to an acceleration suppression control start timing.

(Operation)

Next, using FIGS. 18 to 20 while referring to FIGS. 1 to 15, examples of the operation performed by using the vehicle acceleration suppression device 1 of this embodiment will be described. First, a description will be given of an example in which the own vehicle V traveling in a parking lot enters a parking frame L0 selected by a driver.

In the state where the vehicle speed of the own vehicle V traveling in the parking lot is greater than or equal to the threshold vehicle speed of 15 [km/h], the acceleration suppression control operating condition is not established. Therefore, an acceleration suppression control is not operated for the own vehicle V so that a normal acceleration control reflecting the acceleration intention of the driver is performed.

When the vehicle speed becomes less than the threshold vehicle speed and the parking frame L0 is detected, and further, when the brake pedal 30 is not operated and the depression amount of the accelerator pedal 32 is greater than or equal to the threshold accelerator operation amount, it is determined whether or not the own vehicle V enters the parking frame L0.

While the own vehicle V travels, the parking frame certainty setting unit 36 sets a parking frame certainty and the parking frame entry certainty setting unit 38 sets a parking frame entry certainty. Then, the total certainty setting unit 40 sets a total certainty based on the parking frame certainty and the parking frame entry certainty.

Further, while the own vehicle V travels, based on the total certainty set by the total certainty setting unit 40, the acceleration suppression control start timing computing unit 42 computes an acceleration suppression control start timing and the acceleration suppression control amount computing unit 44 computes an acceleration suppression control amount.

Then, when it is determined that the own vehicle V enters the parking frame L0 and that the acceleration suppression control operating condition is established, the acceleration suppression command value computing unit 10J outputs an acceleration suppression command value signal to the target throttle opening degree computing unit 10K. Further, the target throttle opening degree computing unit 10K outputs a target throttle opening degree signal to the engine controller 12.

Therefore, when the driver operates the accelerator pedal 32 in the state where the acceleration suppression control operating condition is established, an acceleration suppression control amount command value is subtracted from a throttle opening degree corresponding to a depression amount of the accelerator pedal 32 so that the throttle opening degree is set to an opening degree of 50[%] of an actual throttle opening degree. Accordingly, acceleration generated for the own vehicle V is reduced so that acceleration of the vehicle V is suppressed. In addition, the timing to start reducing a throttle opening degree which corresponds to a depression amount of the accelerator pedal 32 (to start suppressing acceleration) is set to a timing corresponding to an acceleration suppression control start timing command value.

Therefore, even if the accelerator pedal 32 is operated due to an erroneous operation or the like in the state where a braking operation is an appropriate driving operation, such as, in the state where the own vehicle V approaches a position suitable for parking in the parking frame L0, the throttle opening degree can be reduced in accordance with a total certainty. That is, in the state where the total certainty is low, the acceleration suppression amount (the degree of reduction of a throttle opening degree) is small so that it is possible to reduce a reduction in drivability, while, in the state where the total certainty is high, the acceleration suppression amount is large so that it is possible to enhance the acceleration suppression effect of the own vehicle V.

As described above, in this embodiment, at the time of parking, it is possible to suppress a reduction in drivability in the parking lot before entering the parking frame L0 and it is possible to suppress acceleration of the own vehicle V at the time of an erroneous operation of the accelerator pedal 32.

Further, in this embodiment, the higher the total certainty, the greater the acceleration suppression control amount is set, thereby suppressing acceleration of the own vehicle V to improve the safety. Further, the lower the total certainty, the more the acceleration suppression control start timing is delayed, thereby suppressing a reduction in drivability. Consequently, it is possible to improve the safety and to suppress a reduction in drivability in the following situation. For example, in the situation of starting the own vehicle V waiting near parking frames L0 for parallel parking marked on the side of a travel lane on a road, it is necessary to allow acceleration to some degree.

Also in the following situation, it is necessary to allow acceleration to some degree. This is a situation where other vehicles are present on both sides (left and right parking frames) of a parking frame L0 in which the own vehicle V is to be parked and the own vehicle V enters from its front side into some space located on the opposite side (the side away from the parking frames), and then, the own vehicle V enters from its rear side into the parking frame L0 in which the own vehicle V is to be parked, thereby parking the own vehicle V.

In these situations, by controlling the acceleration suppression control start timing and the acceleration suppression control amount based on the total certainty, it is possible to suppress acceleration of the own vehicle V to improve the safety. In addition, it is possible to suppress a reduction in drivability by allowing acceleration of the own vehicle V.

Next, a description will be given of an operation example from a state where the own vehicle V left the parking lot, traveled on a public road (non-parking area) at a speed of 30 [km/h] or higher, and then stopped just before (stop line) of an intersection. For the sake of description, it is assumed that, from a speed of 15 [km/h] or less to the stoppage, a road centerline of 15 [m] or more was already detected, a continuous travel distance 100 [m] of the own vehicle V was already detected, or the like so that one of the above-described conditions B1 to B5 required for determining travel in a non-parking area is satisfied.

Figure 18:
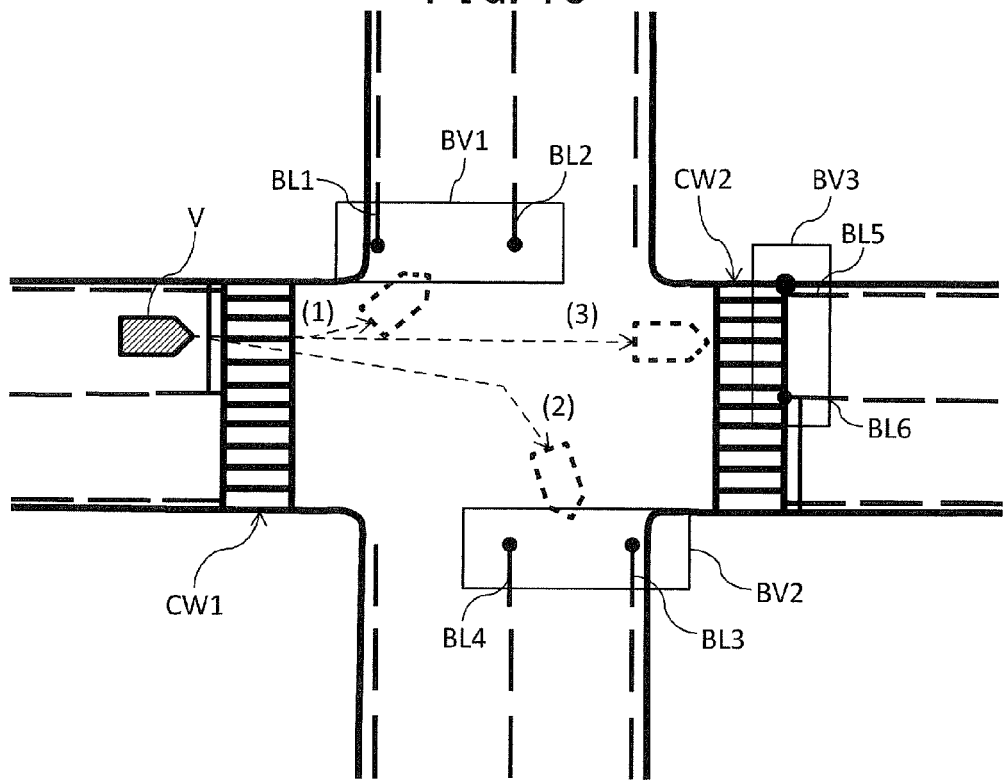
FIG. 18 is a diagram explaining an operation example at an intersection of a crossroads with pedestrian crossings.

Herein, FIG. 18 is a diagram explaining an operation example at an intersection of a crossroads with pedestrian crossings. As shown in FIG. 18, a pedestrian crossing CW1 is located right near a stopping position ahead of the own vehicle V. Therefore, the parking frame certainty setting unit 36 acquires a bird's-eye view image including the pedestrian crossing CW1 (step S2000). Then, the parking frame certainty setting unit 36 applies image processing such as edge detection processing or pattern recognition processing to the acquired bird's-eye view image (step S2010) and detects the pedestrian crossing CW1 ("Yes" at step S2020).

Further, since the own vehicle V is now traveling in a non-parking area ("Yes" at step S2040), the parking frame certainty setting unit 36 sets the intersection detection flag to ON (step S2050).

Thereafter, when the own vehicle V turns left at the intersection at a vehicle speed of 15 [km/h] or less as shown at (1) in FIG. 18, the parking frame certainty setting unit 36 acquires a bird's-eye view image BV1 including road marking lines (broken lines BL1 and BL2 shown in the figure) located ahead as shown in FIG. 18. Consequently, the parking frame certainty setting unit 36 extracts the broken lines BL1 and BL2 present in the bird's-eye view image BV1 as parking frame line candidates (step S206).

On the other hand, since the intersection detection flag is ON, the parking frame certainty setting unit 36 detects a travel distance after detecting the intersection based on a vehicle speed of the own vehicle V and then determines whether or not the detected travel distance is less than or equal to the first travel distance threshold value (e.g. 20 [m]). When the travel distance is less than or equal to the first travel distance threshold value ("Yes" at step S2210), the parking frame certainty setting unit 36 sets the frame line candidate exclusion flag to ON (step S2220).

Since the frame line candidate exclusion flag is ON ("Yes" at step S212), the parking frame certainty setting unit 36 excludes, from parking frame line candidacy, the broken lines BL1 and BL2 extracted as parking frame line candidates (step S214). That is, while the travel distance of the own vehicle V after detecting the intersection is less than or equal to the first travel distance threshold value, the parking frame certainty setting unit 36 continues to exclude a line extracted as a parking frame line candidate.

Therefore, while exclusion is continued, since the parking frame certainty becomes "0", the acceleration suppression operating condition determination unit 34 determines that there is no parking frame ("No" at step S102) so that the acceleration suppression control operating condition is not established (step S128). Consequently, in the vehicle acceleration suppression device 1, either a suppression-present acceleration suppression control or an acceleration suppression control is not operated so that a normal acceleration control reflecting the acceleration intention of the driver is operated.

Further, the parking frame certainty setting unit 36 detects a turning motion of the own vehicle V based on a steering angle of the own vehicle V. Since the own vehicle V is turning left, the parking frame certainty setting unit 36 determines that a turning motion of the own vehicle V is detected ("Yes" at step S2230). Consequently, the parking frame certainty setting unit 36 sets the second travel distance threshold value (e.g. 30 [m]) greater than the first travel distance threshold value (e.g. 20 [m]) (step S2240).

Therefore, thereafter, even if the travel distance of the own vehicle V after detecting the intersection exceeds the first travel distance threshold value ("No" at step S2210), when it is less than or equal to the second travel distance threshold value ("Yes" at step S2260), the frame line candidate exclusion flag continues to be ON (step S2270). Consequently, the process of excluding a line extracted as a parking frame line candidate continues.

Extending the travel distance range, that excludes a parking frame line candidate, when the own vehicle V has performed a turning motion is effective when the own vehicle V turns right at a relatively large intersection, and so on.

This is because, as shown at (2) in FIG. 18, when the own vehicle V turns right at the intersection, the distance until reaching a lane after turning right becomes long compared to the case of turning left and therefore there is a possibility that the travel distance of the own vehicle V exceeds the first travel distance threshold value.

In this embodiment, even if the travel distance of the own vehicle V after detecting the intersection exceeds the first travel distance threshold value, when it is less than or equal to the third travel distance threshold value ("Yes" at step S2290), the suppression control suppression flag is set to ON (step S2300).

Consequently, a suppression-present acceleration suppression control is operated in the vehicle acceleration suppression device 1. In this event, when the operation mode is the suppression mode, the acceleration suppression command value computing unit 10J outputs a suppression-present acceleration suppression command value signal to the target throttle opening degree computing unit 10K. Further, the target throttle opening degree computing unit 10K outputs a target throttle opening degree signal to the engine controller 12.

Therefore, when the driver operates the accelerator pedal 32 in the state where the suppression-present acceleration suppression control operating condition is established, a throttle opening degree corresponding to a depression amount of the accelerator pedal 32 is suppressed to an opening degree corresponding to a suppression-present acceleration suppression control amount command value. That is, the throttle opening degree is set to an opening degree obtained by subtracting a suppression-present acceleration suppression control amount command value from a throttle opening degree corresponding to a depression amount of the accelerator pedal 32. In addition, the timing to start reducing a throttle opening degree which corresponds to a depression amount of the accelerator pedal 32 (to start suppressing acceleration) is set to a timing corresponding to an acceleration suppression control start timing command value.

That is, compared to the case where the acceleration suppression control operating condition is established, the throttle opening degree is reduced by a small reducing amount. Therefore, even if a road marking, such as a broken line, on a public road is erroneously detected as a parking frame while the own vehicle V crosses an intersection, the throttle opening degree is reduced by a relatively small reduction degree so that it is possible to relatively reduce a reduction in drivability at the intersection.

On the other hand, when the operation mode of the suppression-present acceleration suppression control is the stopping mode, a normal acceleration control is operated in the vehicle acceleration suppression device 1. Therefore, even if a road marking, such as a broken line, on a public road is erroneously detected as a parking frame while the own vehicle V crosses an intersection, it is possible to prevent a reduction in drivability due to acceleration suppression control.

When the own vehicle V travels forward at the intersection as shown at (3) in FIG. 18, while the travel distance of the own vehicle V after detecting the intersection is less than or equal to the first travel distance threshold value, since an extracted parking frame line candidate continues to be excluded, a normal acceleration control is operated in the vehicle acceleration suppression device 1. Thereafter, when the travel distance of the own vehicle V after detecting the intersection has exceeded the first travel distance threshold value, while it is less than or equal to the third travel distance threshold value, a suppression-present acceleration suppression control is operated even when a parking frame is erroneously detected, so that a suppression control depending on the set operation mode is operated. When the own vehicle V further travels forward so that the travel distance of the own vehicle V after detecting the intersection has exceeded the third travel distance threshold value, the suppression control suppression flag is set to OFF (step S2310) and then the intersection detection flag is also set to OFF (step S2320), thus returning to the state where an intersection is not detected.

Figure 19:
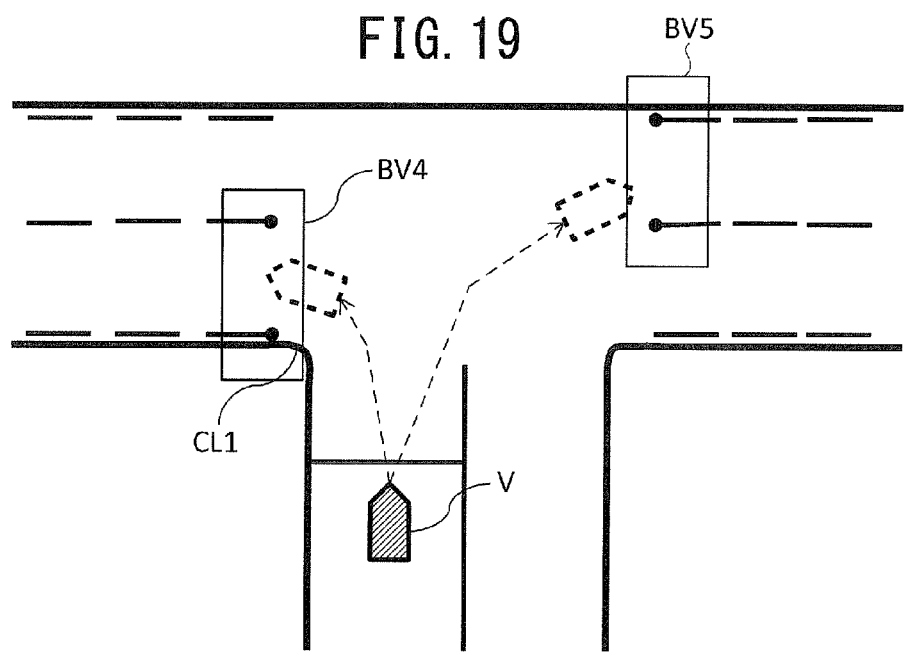
FIG. 19 is a diagram explaining an operation example at an intersection of a T-shaped road with no pedestrian crossing.

While FIG. 18 shows the example in which the pedestrian crossing is located near the own vehicle V, there is also an intersection with no pedestrian crossing as shown in FIG. 19, for example. Herein, FIG. 19 is a diagram explaining an operation example at an intersection of a T-shaped road with no pedestrian crossing.

As shown in FIG. 19, at the intersection with no pedestrian crossing, a road edge line or a road marking line included in a bird's-eye view image ahead of the own vehicle V is detected. In the example shown in FIG. 19, a curved line CL1 shown in the figure is detected and it is determined whether or not the detected curved line CL1 satisfies the preset bending condition. When, by this determination, it is determined that the curved line CL1 satisfies the preset bending condition, it is determined that an intersection is detected ahead of the own vehicle V ("Yes" at step S2020).

Since the subsequent operation is the same as the operation example of FIG. 18 described above, a description thereof will be omitted.

Figures 20, 21:
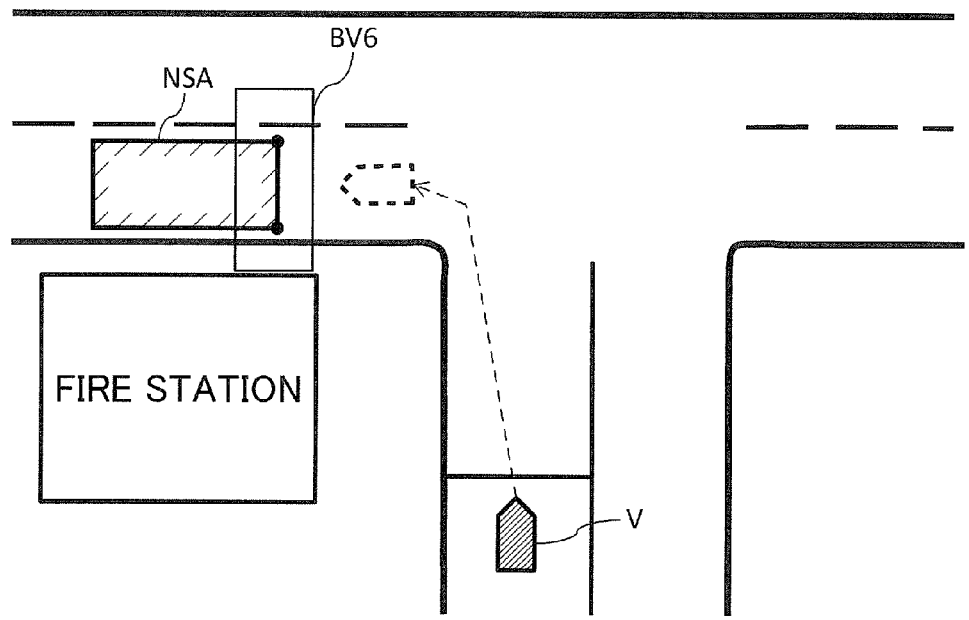
FIG. 20 is a diagram explaining an operation example in the case where there is no pedestrian crossing and a stop line is located away from an intersection.
FIG. 21 is a diagram showing a modification.

FIG. 20 is a diagram explaining an operation example in the case where there is no pedestrian crossing and a stop line is located away from an intersection. In the example shown in FIG. 20, since there is no pedestrian crossing and further the distance from a stopping position of the own vehicle V to the intersection is long, it is not possible to obtain a bird's-eye view image including a curved line. Accordingly, in such a case, an operation pattern of the brake pedal 30 of the own vehicle V is detected based on an operation amount of the brake pedal 30. Then, it is determined whether or not this operation pattern agrees with the preset braking operation pattern for intersection determination and, when it is determined that there is agreement, it is determined that an intersection is detected ahead of the own vehicle V ("Yes" at step S2020).

Since the subsequent operation is the same as the operation example of FIG. 18 described above, a description thereof will be omitted.

In the example of FIG. 20, since there is a fire station just ahead of the own vehicle V after turning left, there is a road marking of a no-stop area NSA on a road in front of the fire station. This no-stop area NSA tends to be erroneously detected as a parking frame line candidate because its shape is similar to the shape of a parking frame. In this embodiment, the intersection is detected and, in this case, the own vehicle V turns left. Therefore, the detected line of the no-stop area NSA is excluded from parking frame line candidacy in a travel distance range in which the travel distance of the own vehicle V after detecting the intersection is less than or equal to the second travel distance threshold value (30 [m]). Therefore, even if the no-stop area NSA is erroneously detected as a parking frame line candidate, an acceleration suppression control is not operated. Consequently, it is possible to prevent a reduction in drivability due to acceleration suppression control.

The acceleration suppression control has been described by giving as an example the control to reduce an acceleration command value that accelerates the vehicle V, but it is not limited to this configuration. For example, an acceleration suppression control may be a control to cause the vehicle V to travel at a low vehicle speed less than or equal to a preset vehicle speed, a control to decelerate (or stop) the vehicle V not only by a driving force control, but also by a brake device, or the like. Further, an acceleration suppression control may be a power transmission control by a clutch connection control (e.g. a clutch is disengaged from gears to disable power transmission during suppression), or the like.

Herein, the accelerator operation detection sensor 24 and the accelerator operation amount computing unit 10G correspond to an acceleration operation amount detection unit.

The acceleration suppression command value computing unit 10J and the target throttle opening degree computing unit 10K correspond to an acceleration control unit. The surrounding environment recognition sensor 14 corresponds to an imaging unit. The determination element extraction process (step S206) implemented by the parking frame certainty setting unit 36 corresponds to a parking frame line candidate detection unit.

The series of processes (steps S216 to S230) which extract a parking frame and set a parking frame certainty, implemented by the parking frame certainty setting unit 36, correspond to a parking frame extraction unit.

The acceleration suppression control start timing computing unit 42, the acceleration suppression control amount computing unit 44, the acceleration suppression command value computing unit 10J, and the target throttle opening degree computing unit 10K correspond to an acceleration suppression control unit.

The intersection detection process (step S206) implemented by the parking frame certainty setting unit 36 corresponds to an intersection detection unit.

The braking operation pattern detection process (step S2010) based on braking force operation amount information acquired in the intersection detection information acquisition process (step S2000), implemented by the parking frame certainty setting unit 36, corresponds to a braking operation pattern detection unit.

The travel distance detection process based on vehicle speed information acquired in the vehicle travel information acquisition process (step S2200), implemented by the parking frame certainty setting unit 36, corresponds to a travel distance detection unit.

The suppression flag setting process and the frame line candidate exclusion process (steps S208 to S214) implemented by the parking frame certainty setting unit 36, the operating condition determination process (steps S120 to S130) implemented by the acceleration suppression operating condition determination unit 34, and the acceleration suppression control suppression process ("Yes" at step S406 to S410, "No" at step S406, S418, and S420) in accordance with the operation mode implemented by the acceleration suppression control amount computing unit 44 correspond to a suppression control suppression unit.

The process of detecting a turning motion of the own vehicle V based on steering angle information acquired in the vehicle travel information acquisition process (step S2200), implemented by the parking frame certainty setting unit 36, corresponds to a turning motion detection unit. The travel road determination process (step S2030) implemented by the parking frame certainty setting unit 36 corresponds to a travel area determination unit.

(Effect of Embodiment)

According to this embodiment, the following effects can be achieved.

(1) The accelerator operation detection sensor 24 and the accelerator operation amount computing unit 10G detect an operation amount (acceleration operation amount) of the accelerator pedal 32. The acceleration suppression command value computing unit 10J and the target throttle opening degree computing unit 10K control acceleration to be generated for the own vehicle V depending on the acceleration operation amount detected by the accelerator operation detection sensor 24 and the accelerator operation amount computing unit 10G. The surrounding environment recognition sensor 14 captures an image of an area including a road surface around the own vehicle. The parking frame certainty setting unit 36 detects, as a parking frame line candidate, a line located on the road surface from the captured image captured by the surrounding environment recognition sensor 14 and extracts a parking frame from the detected parking frame line candidate. Based on the parking frame extracted by the parking frame certainty setting unit 36, the acceleration suppression control start timing computing unit 42, the acceleration suppression control amount computing unit 44, the acceleration suppression command value computing unit 10J, and the target throttle opening degree computing unit 10K perform an acceleration suppression control as a control to reduce acceleration (reduce a throttle opening degree) which is generated for the own vehicle V depending on the acceleration operation amount under the control of the acceleration suppression command value computing unit 10J and the target throttle opening degree computing unit 10K. The acceleration suppression operating condition determination unit 34, the parking frame certainty setting unit 36, and the acceleration suppression control amount computing unit 44 suppress the acceleration suppression control in a predetermined area including an intersection. That is, the acceleration suppression control is suppressed in a predetermined area including an intersection. Consequently, when the own vehicle V is present in the predetermined area including the intersection, a process is implemented to suppress the acceleration suppression control, such as not reducing the acceleration or reducing a reducing amount of the acceleration, and therefore, excessive deceleration or the like due to the acceleration suppression control is not generated. Accordingly, it is possible to prevent or reduce a reduction in drivability due to the acceleration suppression control at the intersection.

(2) The parking frame certainty setting unit 36 detects an intersection lying ahead of the own vehicle V and, based on a result of this detection, detects a travel distance of the own vehicle V after detecting the intersection. The acceleration suppression operating condition determination unit 34, the parking frame certainty setting unit 36, and the acceleration suppression control amount computing unit 44 suppress an acceleration suppression control when it is determined, based a result of the detection of the travel distance, that the travel distance is less than or equal to the preset first travel distance threshold value. That is, when an intersection is detected ahead of the own vehicle V, an acceleration suppression control is suppressed in a travel distance range in which the travel distance of the own vehicle V after detecting the intersection is less than or equal to the first travel distance threshold value. Consequently, when the own vehicle V crosses the intersection, a process is implemented to suppress the acceleration suppression control, such as not reducing the acceleration or reducing a reducing amount of the acceleration, and therefore, excessive deceleration or the like due to the acceleration suppression control is not generated. Accordingly, it is possible to prevent or reduce a reduction in drivability due to the acceleration suppression control at the intersection.

(3) The acceleration suppression operating condition determination unit 34, the parking frame certainty setting unit 36, and the acceleration suppression control amount computing unit 44 suppress an acceleration suppression control by excluding a parking frame line candidate detected by the parking frame certainty setting unit 36 in a travel distance range in which the travel distance of the own vehicle V after detecting an intersection is less than or equal to the first travel distance threshold value. That is, when an intersection is detected ahead of the own vehicle V, an acceleration suppression control is not performed by excluding a parking frame line candidate from a control object for the acceleration suppression control in a travel distance range in which the travel distance of the own vehicle V after detecting the intersection is less than or equal to the first travel distance threshold value. Consequently, since suppression of the acceleration is not generated when the own vehicle V crosses the intersection, it is possible to prevent a reduction in drivability due to the acceleration suppression control at the intersection.

(4) The parking frame certainty setting unit 36 detects a turning motion of the own vehicle V. When the acceleration suppression operating condition determination unit 34, the parking frame certainty setting unit 36, and the acceleration suppression control amount computing unit 44 determine, based on a result of the detection of the turning motion, that the own vehicle V has performed the turning motion in a travel distance range in which the travel distance of the own vehicle V after detecting an intersection is less than or equal to the first travel distance threshold value, a process of excluding a parking frame line candidate detected by the parking frame certainty setting unit 36 from a control object for an acceleration suppression control continues to be implemented until the travel distance of the own vehicle V exceeds the preset second travel distance threshold value (e.g. 30 [m]) greater than the first travel distance threshold value (e.g. 20 [m]). That is, when the own vehicle V has performed, for example, a right turning motion or a left turning motion at an intersection, even if the travel distance of the own vehicle V from a time point of detecting the intersection exceeds the first travel distance threshold value, until it exceeds the second travel distance threshold value, a detected parking frame line candidate continues to be excluded from the control object.

Herein, the vehicle speed of the own vehicle V tends to be less than or equal to 15 [km/h] during a turning motion, particularly a right turning motion or a left turning motion, at an intersection, and in addition, a number of road markings that tend to be erroneously detected as parking frame line candidates are present ahead of the own vehicle V after turning right or turning left. Therefore, after turning right or turning left at the intersection, there appears a situation where an acceleration suppression control due to erroneous detection of a parking frame tends to occur. In view of such a situation, the travel distance range that excludes a detected parking frame line candidate from the control object is extended and, therefore, suppression of an acceleration suppression control can be facilitated after turning of the own vehicle V at the intersection. Consequently, it is possible to further prevent or reduce a reduction in drivability due to the acceleration suppression control after turning right or left at the intersection.

(5) The parking frame certainty setting unit 36 determines whether or not the own vehicle V is traveling in a non-parking area as a travel area other than a preset parking area. An intersection that can be detected in a time period during which the parking frame certainty setting unit 36 determines, based on a result of the travel area determination, that the own vehicle V is traveling in the parking area, is excluded from a detection object. Consequently, an intersection that is detected in a large parking lot or the like having intersections can be excluded from an object of a process that suppresses an acceleration suppression control. Therefore, in the parking lot, it is possible to prevent the occurrence of a situation where acceleration is not reduced in the state where it should be reduced, a reducing amount is insufficient, or the like.

(6) When the parking frame certainty setting unit 36 detects at least one of a pedestrian crossing and a curved line satisfying the preset bending condition, which are present on a road surface ahead of the own vehicle V, it determines that an intersection lying ahead of the own vehicle V is detected. When there is a pedestrian crossing ahead of the own vehicle V or there is a curved line forming a left-turn road ahead of the own vehicle V, the probability of the presence of an intersection ahead of the own vehicle V is relatively high and therefore it is configured that an intersection is determined to be detected in such a case. Consequently, since an acceleration suppression control can be suppressed by detecting an intersection more reliably, it is possible to suppress the acceleration suppression control more appropriately.

(7) The brake operation detection sensor 22 and the brake pedal operation information computing unit 10F detect a depression operation amount (braking force operation amount) of the brake pedal 30. The parking frame certainty setting unit 36 detects an operation pattern of the brake pedal 30 based on the braking force operation amount detected by the brake operation detection sensor 22 and the brake pedal operation information computing unit 10F. When the parking frame certainty setting unit 36 determines that the operation pattern of the brake pedal 30 agrees with the preset operation pattern, it determines that an intersection lying ahead of the own vehicle V is detected. There is an operation pattern of the brake pedal 30 that often occurs just before an intersection, such as, for example, the brake pedal 30 is depressed for a relatively long time (e.g. 10 seconds or more) just before an intersection. A plurality of such operation patterns are prepared in advance, for example, and then an actual operation pattern when a driver of the own vehicle V has operated the brake pedal 30 is detected, thereby comparing this operation pattern to the prepared patterns. Consequently, it is possible to more reliably detect an intersection lying ahead of the own vehicle V.

(8) The acceleration suppression operating condition determination unit 34, the parking frame certainty setting unit 36, and the acceleration suppression control amount computing unit 44 suppress an acceleration suppression control by stopping the acceleration suppression control (stopping mode) or reducing a normal reducing amount of acceleration in the acceleration suppression control (suppression mode). That is, since the acceleration suppression control is suppressed by stopping the acceleration suppression control or reducing a normal reducing amount of acceleration in the acceleration suppression control, it is possible to more appropriately prevent or reduce a reduction in drivability due to the acceleration suppression control at an intersection.

(Modification)

(1) In this embodiment, it is determined whether or not a pedestrian crossing is detected ahead of the own vehicle V, whether or not a curved line is detected ahead of the own vehicle V, or whether or not a braking operation pattern of a driver of the own vehicle V agrees with the preset braking operation pattern. Then, it is configured to detect an intersection based on a result of this determination. However, the configuration is not limited thereto. For example, it is assumed that a white line (road marking line or the like) present on a road surface ahead of the own vehicle V cannot be detected in a captured image (may be a bird's-eye view image) due to another vehicle present ahead of the own vehicle V. Thereafter, when the own vehicle V travels forward while the preceding other vehicle turns right or left so that the white line present on the road surface can be suddenly detected, it may be configured to detect an intersection based on a result of this detection. Determination of turning right or left of the preceding vehicle can be performed, for example, by detecting an edge line of the other vehicle in a captured image or a bird's-eye view image and then detecting that the edge line moves in a left-right direction from a center position of the image and disappears from the image (or a screen). Alternatively, it is assumed that, in the state where the white line (road marking line or the like) present on the road surface cannot be detected due to the preceding vehicle, the preceding vehicle present ahead of the own vehicle V travels forward while the own vehicle V turns right or left so that the line present on the road surface can be suddenly detected. In this case, it may be configured to detect the intersection based on a result of this detection. These methods may be configured to be performed either instead of or in addition to the detection methods of this embodiment.

(2) In this embodiment, it is determined whether or not a pedestrian crossing is detected ahead of the own vehicle V, whether or not a curved line is detected ahead of the own vehicle V, or whether or not a braking operation pattern of a driver of the own vehicle V agrees with the preset braking operation pattern. Then, it is configured to detect an intersection based on a result of this determination. However, the configuration is not limited thereto. For example, instead of or in addition to these detection methods, it may be configured to detect an intersection based on information (e.g. link branch information etc.) measured by the navigation device 26.

(3) In this embodiment, it is configured to suppress an acceleration suppression control by implementing one of a process of excluding a parking frame line candidate from a control object, a process of reducing a reducing amount of acceleration in the acceleration suppression control, and a process of stopping the acceleration suppression control, based on a travel distance after detecting an intersection ahead of the own vehicle V. However, the configuration is not limited thereto. For example, it may alternatively be configured to suppress an acceleration suppression control by reducing a level of a parking frame certainty (or a level of a total certainty), or the like.

(4) In this embodiment, it is configured to implement the intersection detection process (step S204) and the suppression flag setting process (step S210) in the parking frame certainty setting unit 36. However, the configuration is not limited thereto. For example, it may be configured that an intersection detection unit and a suppression flag setting unit are provided separately from the parking frame certainty setting unit 36 and that the process of FIG. 8 and the process of FIG. 9 are implemented by the respective constituent units.

(5) In this embodiment, an acceleration suppression control start timing and an acceleration suppression control amount are computed based on a total certainty set by the total certainty setting unit 40. However, the configuration is not limited thereto. That is, an acceleration suppression control start timing and an acceleration suppression control amount may be computed based on only a parking frame certainty set by the parking frame certainty setting unit 36. In this case, the acceleration suppression control start timing and the acceleration suppression control amount are computed, for example, by matching the parking frame certainty to an acceleration suppression condition computing map shown in FIG. 21. FIG. 21 is a diagram showing a modification of this embodiment.

(6) In this embodiment, the parking frame certainty setting unit 36 is configured to set a parking frame certainty based on a bird's-eye view image (environment) around the own vehicle V and a vehicle speed (travel state) of the own vehicle V. However, the configuration of the parking frame certainty setting unit 36 is not limited thereto. That is, the parking frame certainty setting unit 36 may be configured to set a parking frame certainty by using, in addition to the bird's-eye view image around the own vehicle V and the vehicle speed of the own vehicle V, a current position of the own vehicle V included in an own vehicle position signal and a type of a road (road type), on which the own vehicle V is traveling, included in a travel road information signal. In this case, for example, when the parking frame certainty setting unit 36 detects, based on the information included in the own vehicle position signal and the travel road information signal, that the current position of the own vehicle V is on a public road, it determines that no parking frame L0 is present around the own vehicle V, and sets the parking frame certainty to "level 0". Consequently, for example, when the own vehicle V enters a parking frame for which the operation of an acceleration suppression control is not suitable, such as a parking frame arranged on the roadside on the public road, it is possible to suppress a reduction in drivability of the own vehicle V.

(7) In this embodiment, when the parking frame certainty setting unit 36 determines that the endpoints of the lines La and Lb are opposite to each other in the width WL direction, it implements the process of setting the parking frame certainty to the level 3 or the level 4 (see step S230). However, the process of setting the parking frame certainty to the level 3 or the level 4 is not limited thereto. That is, when it is recognized that the endpoint shape of the line L is a shape not marked on a public road, such as, for example, a U-shape (see FIG. 4(*g*) to (*k*), (*m*), and (*n*)), the parking frame certainty may be set to the level 3 or the level 4.

(8) In this embodiment, the parking frame certainty setting unit 36 is configured to set a parking frame certainty based on a bird's-eye view image (environment) around the own vehicle V and a vehicle speed (travel state) of the own vehicle V. However, the configuration of the parking frame certainty setting unit 36 is not limited thereto. That is, when the configuration of the own vehicle V includes, for example, a device (parking support device) that supports a steering operation of a driver for a parking frame L0, it may be configured that the level of the parking frame certainty tends to rise when the parking support device is in an ON state. Herein, the configuration that the level of the parking frame certainty tends to rise is, for example, a configuration that the above-described preset movement distance is set to a distance shorter than normal, or the like.

(9) In this embodiment, an acceleration suppression control amount and an acceleration suppression control start timing are changed based on a total certainty, thereby changing the suppression degree of an acceleration command value. However, the configuration is not limited thereto. That is, only an acceleration suppression control start timing or only an acceleration suppression control amount may be changed in accordance with a total certainty, thereby changing the suppression degree of an acceleration command value. In this case, for example, it may be configured that the higher the total certainty, the greater the acceleration suppression control amount is set, while, the acceleration suppression control start timing is not changed, thereby increasing the suppression degree of an acceleration command value.

(10) In this embodiment, acceleration of the own vehicle V corresponding to a depression amount (acceleration operation amount) of the accelerator pedal 32 is suppressed by controlling an acceleration command value. However, the configuration is not limited thereto. That is, for example, a throttle opening degree corresponding to a depression amount (acceleration operation amount) of the accelerator pedal 32 may be set as a target throttle opening degree and, further, a braking force may be generated by the above-described brake device, thereby suppressing acceleration of the own vehicle V which corresponds to the acceleration operation amount.

(11) In this embodiment, parking frame certainties are computed at the level 0 of the minimum value and the levels (levels 1 to 4) which are a plurality of steps higher than the minimum value. However, the steps of the parking frame certainty are not limited thereto. That is, parking frame certainties may be computed at a level (e.g. "level 0") of a minimum value and a level (e.g. "level 100") higher than the minimum value, of only two steps.

(12) In this embodiment, parking frame entry certainties are computed at "level 0" of the minimum value, "level low" higher than the level 0, and "level high" higher than the level low. However, the steps of the parking frame entry certainty are not limited thereto. That is, parking frame entry certainties may be computed at a level (e.g. "level 0") of a minimum value and a level (e.g. "level 100") higher than the minimum value, of only two steps.

(13) In this embodiment, a total certainty is computed at one of the four-step levels ("extremely low", "low", "high", "extremely high") in accordance with a parking frame certainty computed at one of the five-step levels and a parking frame entry certainty computed at one of the three-step levels. However, the steps of the total certainty are not limited thereto. That is, total certainties may be computed at a level (e.g. "level 0") of a minimum value and a level (e.g. "level 100") higher than the minimum value, of only two steps.

In this case, for example, when the parking frame certainty and the parking frame entry certainty are computed at the level of the minimum value, the total certainty is computed at the level of the minimum value. Further, for example, when the parking frame certainty and the parking frame entry certainty are computed at the level higher than the minimum value, the total certainty is computed at the level higher the minimum value.

This embodiment is a preferred specific example of the present invention and given various limitations which are technically preferable. However, the scope of the present invention is not limited to these aspects unless there is a particular description to limit the present invention in the foregoing description. Further, the drawings used in the foregoing description are exemplary figures in which vertical and horizontal scales of members and portions are different from actual members or portions for the sake of illustration. Further, the present invention is not limited to the above-described embodiment, and modifications, improvements, equivalents, and so on within a range that can accomplish the object of the present invention are included in the present invention.

While the present invention has been described herein referring to a limited number of embodiments, the scope of rights is not limited to them. Modifications of the embodiments based on the above-described disclosure are apparent to those skilled in the art.

Reference Signs List

The invention claimed is:

1. A vehicle acceleration suppression device comprising:
   an acceleration operation amount detection unit configured to detect an acceleration operation amount of an acceleration operation member configured to be operated by a driver for instructing acceleration;
   an acceleration control unit configured to control acceleration to be generated for an own vehicle depending on the acceleration operation amount detected by the acceleration operation amount detection unit;
   an imaging unit configured to capture an image of an area including a road surface around the own vehicle;
   a parking frame line candidate detection unit configured to detect, from the image captured by the imaging unit, a line located on the road surface as a parking frame line candidate;
   a parking frame extraction unit configured to extract a parking frame from the parking frame line candidate detected by the parking frame line candidate detection unit;
   an acceleration suppression control unit configured to implement an acceleration suppression control based on the parking frame extracted by the parking frame extraction unit, the acceleration suppression control configured to reduce the acceleration controlled by the acceleration control unit; and
   a suppression control suppression unit configured to suppress the acceleration suppression control in a predetermined area including an intersection.

2. The vehicle acceleration suppression device according to claim 1, comprising:
   an intersection detection unit configured to detect an intersection lying ahead of the own vehicle; and
   a travel distance detection unit configured to detect, based on a detection result of the intersection detection unit, a travel distance of the own vehicle after detecting the intersection,
   wherein the suppression control suppression unit suppresses the acceleration suppression control when the suppression control suppression unit determines, based on a detection result of the travel distance detection unit, that the travel distance is less than or equal to a preset first travel distance threshold value.

3. The vehicle acceleration suppression device according to claim 2, wherein the suppression control suppression unit suppresses the acceleration suppression control by excluding, from a control object for the acceleration suppression control, the parking frame line candidate detected by the parking frame line candidate detection unit in a travel distance range in which the travel distance of the own vehicle after detecting the intersection is less than or equal to the first travel distance threshold value.

4. The vehicle acceleration suppression device according to claim 3, further comprising a turning motion detection unit configured to detect a turning motion of the own vehicle,
   wherein when the suppression control suppression unit determines, based on a detection result of the turning motion detection unit, that the own vehicle has performed the turning motion in the travel distance range in which the travel distance of the own vehicle after detecting the intersection is less than or equal to the first travel distance threshold value, the suppression control suppression unit continues to implement a process of excluding the parking frame line candidate detected by the parking frame line candidate detection unit from the control object for the acceleration suppression control until the travel distance of the own vehicle exceeds a preset second travel distance threshold value greater than the first travel distance threshold value.

5. The vehicle acceleration suppression device according to claim 2, further comprising a travel area determination unit configured to determine whether or not the own vehicle is traveling in a non-parking area as a travel area other than a preset parking area,
   wherein the intersection detection unit excludes, from a detection object, an intersection that can be detected by the intersection detection unit in a time period during which the intersection detection unit determines, based on a determination result of the travel area determination unit, that the own vehicle is traveling in the parking area.

6. The vehicle acceleration suppression device according to claim 2, wherein when the intersection detection unit detects at least one of a pedestrian crossing and a curved line satisfying a preset bending condition, which are present on a road surface ahead of the own vehicle, the intersection detection unit determines that an intersection lying ahead of the own vehicle is detected.

7. The vehicle acceleration suppression device according to claim 2, further comprising:
   a braking force operation amount detection unit configured to detect a braking force operation amount which is an operation amount of a braking force instruction operation member configured to be operated by the driver of the own vehicle for instructing a braking force of the own vehicle; and
   a braking operation pattern detection unit configured to detect an operation pattern of the braking force instruction operation member based on the braking force operation amount detected by the braking force operation amount detection unit,
   wherein when the intersection detection unit determines that the operation pattern of the braking force instruction operation member agrees with a preset operation pattern, the intersection detection unit determines that an intersection lying ahead of the own vehicle is detected.

8. The vehicle acceleration suppression device according to claim 1, wherein the suppression control suppression unit suppresses the acceleration suppression control by stopping the acceleration suppression control or reducing a normal reducing amount of the acceleration in the acceleration suppression control.

9. A vehicle acceleration suppression method comprising:
   implementing an acceleration suppression control which is a control configured to extract a parking frame from a line located on a road surface and detected from an image capturing an area including a road surface around an own vehicle, and configured to, based on the extracted parking frame, reduce acceleration which is generated for the own vehicle depending on an acceleration operation amount of an acceleration operation member configured to be operated by a driver for instructing acceleration; and
   implementing a process of suppressing the acceleration suppression control in a predetermined area including an intersection.

* * * * *